US012328608B2

(12) United States Patent
He

(10) Patent No.: US 12,328,608 B2
(45) Date of Patent: Jun. 10, 2025

(54) DISASTER RECOVERY PROCESSING METHOD AND APPARATUS

(71) Applicant: Huawei Technologies Co., Ltd., Shenzhen (CN)

(72) Inventor: Long He, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/936,599

(22) Filed: Sep. 29, 2022

(65) Prior Publication Data

US 2023/0026631 A1  Jan. 26, 2023

Related U.S. Application Data

(63) Continuation of application No. PCT/CN2020/133904, filed on Dec. 4, 2020.

(30) Foreign Application Priority Data

Mar. 30, 2020 (CN) .................... 202010236502.X

(51) Int. Cl.
*H04W 24/04* (2009.01)
*H04L 41/0663* (2022.01)

(52) U.S. Cl.
CPC ......... *H04W 24/04* (2013.01); *H04L 41/0663* (2013.01)

(58) Field of Classification Search
CPC ............. H04L 41/0663; H04L 41/0654; H04L 41/0695; H04L 41/00
See application file for complete search history.

(56) References Cited

U.S. PATENT DOCUMENTS

2017/0064596 A1\* 3/2017 Wang .................... H04W 28/06
2017/0332226 A1  11/2017 Bharatia

FOREIGN PATENT DOCUMENTS

CN  108632945 A  10/2018
CN  109120426 A  1/2019
(Continued)

OTHER PUBLICATIONS

3rd Generation Partnership Project; Technical Specification Group Services and System Aspects; System architecture for the 5G System (5GS); Stage 2 (Release 16), 3GPP TS 23.501 V16.4.0, uploaded on Mar. 27, 2020 (Year: 2020).\*
(Continued)

*Primary Examiner* — Sun Jong Kim
(74) *Attorney, Agent, or Firm* — Slater Matsil, LLP

(57) ABSTRACT

A first network slice selection network element sends a synchronization request message to a second network slice selection network element, where the synchronization request message includes an identifier of an access management network element and slice availability information of the access management network element; the first network slice selection network element receives a task deletion message from the second network slice selection network element, where the task deletion message includes the identifier of the access management network element or a task identifier of a first subscription task, and the first subscription task is a subscription task that is for the slice availability information of the access management network element and that is created in the first network slice selection network element; and the first network slice selection network element deletes the first subscription task.

17 Claims, 16 Drawing Sheets

(56) References Cited

FOREIGN PATENT DOCUMENTS

| CN | 110140386 A | 8/2019 |
| CN | 110366144 A | 10/2019 |
| CN | 110461027 A | 11/2019 |
| CN | 110679185 A | 1/2020 |
| WO | 2018035694 A1 | 3/2018 |
| WO | 2020019991 A1 | 1/2020 |

OTHER PUBLICATIONS

3rd Generation Partnership Project; Technical Specification Group Core Network and Terminals; 5G System; Network System Selection Services; Stage 3 (Release (Release 16), 3GPP TS 29.531.501 V16.4.0, uploaded on Dec. 20, 2019 (Year: 2019).*

3GPP TS 23.502 V15.9.0 (Mar. 2020), 3rd Generation Partnership Project; Technical Specification Group Services and System Aspects; Procedures for the 5G System (5GS); Stage 2 (Release 15), 362 pages.

Apple, "A solution of network slice instance selection and association", SA WG2 Meeting #S2-116BIS, S2-164599, Sanya, P.R China, Aug. 29-Sep. 2, 2016, 6 pages.

Ericsson, "NSSF and Slice selection during the Registration procedures", SA WG2 Meeting #122, S2-174202, San Jose Del Cabo, Jun. 26-30, 2017, 12 pages.

3GPP TS 23.501 V16.4.0 (Mar. 2020), 3rd Generation Partnership Project; Technical Specification Group Services and System Aspects; System architecture for the 5G System (5GS); Stage 2 (Release 16), 430 pages.

3GPP TS 23.502 V16.4.0 (Mar. 2020), 3rd Generation Partnership Project; Technical Specification Group Services and System Aspects; Procedures for the 5G System (5GS); Stage 2 (Release 16), 582 pages.

3GPP TS 29.510 V16.2.0 (Dec. 2019) 3rd Generation Partnership Project; Technical Specification Group Core Network and Terminals; 5G System; Network Function Repository Services; Stage 3 (Release 16), 167 pages.

3GPP TS 29.531 V16.1.0 (Dec. 2019) 3rd Generation Partnership Project; Technical Specification Group Core Network and Terminals; 5G System; Network Slice Selection Services; Stage 3 (Release 16), 53 pages.

* cited by examiner

CONT. FROM FIG. 2A

CONT. FROM FIG. 2A

CONT. FROM FIG. 2A

Step S206: Send a second request message to the second network slice selection network element, where the second request message is used to subscribe to a change notification of the slice availability information of the access management network element Step S207: Receive the second request message from the access management network element Step S208: Create a second subscription task for the slice availability information of the access management network element Step S209: Send a task deletion message Step S210: Delete a first subscription task

FIG. 2B

DISASTER RECOVERY PROCESSING METHOD AND APPARATUS

CROSS-REFERENCE TO RELATED APPLICATIONS

This application is a continuation of International Application No. PCT/CN2020/133904, filed on Dec. 4, 2020, which claims priority to Chinese Patent Application No. 202010236502.X, filed on Mar. 30, 2020. The disclosures of the aforementioned applications are hereby incorporated by reference in their entireties.

TECHNICAL FIELD

This application relates to the field of wireless communications technologies, and in particular, to a disaster recovery processing method and an apparatus.

BACKGROUND

A network slice selection function (NSSF) network element is a new network function in a 5G network, and mainly provides functions such as slice query and selection and slice availability services externally. In a multi-slice deployment networking scenario, the NSSF network element may select an available access and mobility management function (AMF) that provides a service for a network slice requested by a user, manage a slice availability control policy, and synchronize the slice availability control policy to a corresponding AMF when the slice availability control policy changes.

Currently, a fault and recovery processing procedure related to the NSSF network element is not clearly defined in a 3GPP protocol. However, a proper and clear fault and recovery processing procedure related to the NSSF network element is very important in ensuring continuity, reliability, and the like of a slice service.

SUMMARY

Embodiments of this application provide a disaster recovery processing method and an apparatus, to perform corresponding disaster recovery processing when a fault related to a network slice selection network element occurs.

According to a first aspect, an embodiment of this application provides a disaster recovery processing method. The method may be performed by a first network slice selection network element. For example, the first network slice selection network element may be a first NSSF. The method includes: The first network slice selection network element receives slice availability information from an access management network element, where the slice availability information is for supporting the first network slice selection network element in providing a slice availability service for the access management network element; the first network slice selection network element sends a synchronization request message to a second network slice selection network element, where the synchronization request message includes an identifier of the access management network element and the slice availability information, and the second network slice selection network element is a disaster recovery network slice selection network element of the first network slice selection network element; the first network slice selection network element receives a task deletion message from the second network slice selection network element, where the task deletion message includes the identifier of the access management network element or a task identifier of a first subscription task, and the first subscription task is a subscription task that is for the slice availability information of the access management network element and that is created in the first network slice selection network element; and the first network slice selection network element deletes the first subscription task.

In this embodiment of this application, the first network slice selection network element may synchronize the slice availability information received from the access management network element to the disaster recovery network slice selection network element of the first network slice selection network element, namely, the second network slice selection network element. In this way, when the first network slice selection network element is faulty or a communication link between the access management network element and the first network slice selection network element is faulty, the second network slice selection network element may take over the slice availability service originally provided by the first network slice selection network element, to ensure that a slice availability service function remains normal. In addition, the second network slice selection network element may further send the task deletion message to the first network slice selection network element, to delete the subscription task that is for the slice availability information and that is originally created by the first network slice selection network element. In this way, procedure processing confusion caused by sending subscription notifications by a plurality of network slice selection network elements to a same access management network element can be avoided, and uniqueness of the slice availability information of the access management network element is ensured.

In a possible design of the first aspect, that the first network slice selection network element provides a slice availability service for the access management network element may be: The first network slice selection network element receives a first request message from the access management network element, where the first request message is used to subscribe to a change notification of the slice availability information of the access management network element; and the first network slice selection network element creates the first subscription task, where the first subscription task is used to notify the access management network element when the slice availability information of the access management network element changes.

In this embodiment of this application, the first network slice selection network element may create the first subscription task based on the first request message received from the access management network element, to provide the slice availability service for the access management network element. To be specific, when the slice availability information of the access management network element changes, the first network slice selection network element sends a notification message to the access management network element, to notify the access management network element of changed slice availability information.

In a possible design of the first aspect, the method further includes: The first network slice selection network element sends a first notification message to the access management network element, where the first notification message includes the changed slice availability information of the access management network element; or the first network slice selection network element sends task information of the first subscription task to the access management network element and/or the second network slice selection network element, where the task information includes the task identifier of the first subscription task.

In this embodiment of this application, the first network slice selection network element may alternatively send the task information of the created first subscription task to the access management network element and the second network slice selection network element, so that the access management network element and the second network slice selection network element are enabled to perform corresponding disaster recovery processing based on the task information. For example, the access management network element may include the task identifier of the first subscription task in a second request message that is sent to the second network slice selection network element and that is used to re-subscribe to the slice availability service, or the second network slice selection network element may include the task identifier of the first subscription task in the task deletion message sent to the first network slice selection network element, to indicate a specific subscription task that needs to be deleted.

According to a second aspect, an embodiment of this application provides another disaster recovery processing method. The method may be performed by a second network slice selection network element. For example, the second network slice selection network element may be a second NSSF. The method includes: The second network slice selection network element receives a synchronization request message from a first network slice selection network element, where the synchronization request message includes an identifier of an access management network element and slice availability information of the access management network element, the slice availability information is for supporting the second network slice selection network element in providing a slice availability service for the access management network element, and the second network slice selection network element is a disaster recovery network slice selection network element of the first network slice selection network element; the second network slice selection network element receives a second request message from the access management network element, where the second request message includes an identifier of the first network slice selection network element, and the second request message is used to subscribe to a change notification of the slice availability information of the access management network element; and the second network slice selection network element sends a task deletion message to the first network slice selection network element, where the task deletion message includes the identifier of the access management network element or a task identifier of a first subscription task, the first subscription task is a subscription task that is for the slice availability information of the access management network element and that is created in the first network slice selection network element, and the task deletion message indicates the first network slice selection network element to delete the first subscription task.

In this embodiment of this application, the second network slice selection network element may receive the synchronized slice availability information of the access management network element from the first network slice selection network element, and after receiving the second request message sent by the access management network element, take over the slice availability service for the access management network element that is originally under the charge of the first network slice selection network element. The second network slice selection network element may further send the task deletion message to the first network slice selection network element, to indicate the first network slice selection network element to delete the first subscription task. In this way, on one hand, it can be ensured that the slice availability service remains normal, on the other hand, procedure processing confusion caused by sending subscription notifications by a plurality of network slice selection network elements to a same access management network element is avoided, and uniqueness of the slice availability information of the access management network element is ensured.

In a possible design of the second aspect, in a scenario in which the access management network element and the first network slice selection network element are faulty, the second network slice selection network element may directly send the task deletion message to the first network slice selection network element, to delete the first subscription task in the first network slice selection network element.

In a scenario in which the first network slice selection network element is faulty, the second network slice selection network element may receive a fault notification message from a network repository function network element, where the fault notification message indicates that the first network slice selection network element is faulty. In this way, the second network slice selection network element may record a task deletion flag. Then, the second network slice selection network element may further receive a fault recovery message from the network repository function network element, where the fault recovery message indicates fault recovery of the first network slice selection network element. The second network slice selection network element may send the task deletion message to the first network slice selection network element based on the previously recorded task deletion flag, to delete the first subscription task in the first network slice selection network element.

In this embodiment of this application, the second network slice selection network element may successfully send the task deletion message to the first network slice selection network element in both two possible fault scenarios in which the first network slice selection network element is faulty and in which a communication link between the access management network element and the first network slice selection network element is faulty, so that applicability of the method is enhanced.

In a possible design of the second aspect, the second network slice selection network element may create a second subscription task for the slice availability information of the access management network element. For example, the second network slice selection network element may create the second subscription task after receiving the second request message from the access management network element, where the second subscription task is used to notify the access management network element when the slice availability information of the access management network element changes.

In this embodiment of this application, the second network slice selection network element may create the second subscription task based on the second request message received from the access management network element, to provide the slice availability service for the access management network element. To be specific, when the slice availability information of the access management network element changes, the second network slice selection network element sends a notification message to the access management network element, to notify the access management network element of changed slice availability information.

In a possible design of the second aspect, the second network slice selection network element may further send a second notification message to the access management network element, where the second notification message includes the changed slice availability information of the access management network element. The second notification message may also be understood as being used to respond to the second request message.

In a possible design of the second aspect, the second network slice selection network element may further receive task information of the first subscription task from the first network slice selection network element, where the task information includes the task identifier of the first subscription task; or the second request message includes the task identifier of the first subscription task, in other words, the second network slice selection network element may alternatively obtain the task identifier of the first subscription task from the second request message sent by the access management network element.

In this embodiment of this application, the second network slice selection network element may include, in the task deletion message, the task identifier that is of the first subscription task and that is obtained from the first network slice selection network element or the access management network element, to indicate a specific subscription task that needs to be deleted to the first network slice selection network element.

According to a third aspect, an embodiment of this application provides another disaster recovery processing method. The method may be performed by an access management network element. For example, the access management network element may be an AMF. The method includes: The access management network element sends slice availability information to a first network slice selection network element, where the slice availability information is for supporting the first network slice selection network element in providing a slice availability service for the access management network element; the access management network element determines that the first network slice selection network element or a communication link between the access management network element and the first network slice selection network element is faulty; and the access management network element sends a second request message to a second network slice selection network element, where the second request message includes an identifier of the first network slice selection network element, the second request message is used to subscribe to a change notification of the slice availability information of the access management network element, and the second network slice selection network element is a disaster recovery network slice selection network element of the first network slice selection network element.

In this embodiment of this application, when determining that the first network slice selection network element is faulty or the communication link between the access management network element and the first network slice selection network element is faulty, the access management network element may send the second request message to the disaster recovery network slice selection network element of the first network slice selection network element, namely, the second network slice selection network element, to re-subscribe to the slice availability service from the second network slice selection network element, and to ensure that latest slice availability information can be learned of in time.

In a possible design of the third aspect, that the access management network element determines that the first network slice selection network element is faulty may be: The access management network element receives a fault notification message from a network repository function network element, and learns that the first network slice selection network element is faulty based on the fault notification message, where the fault notification message indicates that the first network slice selection network element is faulty.

That the access management network element determines that the communication link between the access management network element and the first network slice selection network element is faulty may be: The access management network element detects that the communication link between the access management network element and the first network slice selection network element is faulty.

It can be learned that the disaster recovery processing method provided in this application may be applied to two possible fault scenarios in which the first network slice selection network element is faulty and in which a communication link between the access management network element and the first network slice selection network element is faulty, so that applicability of the method is enhanced.

In a possible design of the third aspect, the second request message may further include a task identifier of a first subscription task, and the first subscription task is a subscription task that is for the slice availability information of the access management network element and that is created in the first network slice selection network element. The method further includes: The access management network element receives task information of the first subscription task from the first network slice selection network element, where the task information includes the task identifier of the first subscription task. To be specific, the task identifier of the first subscription task in the second request message may be obtained by the access management network element based on the task information that is of the first subscription task and that is received from the first network slice selection network element.

In this embodiment of this application, the access management network element may include the task identifier of the first subscription task in the second request message, so that the second network slice selection network element sends a corresponding task deletion message.

In a possible design of the third aspect, the access management network element may further receive a second notification message from the second network slice selection network element, where the second notification message includes changed slice availability information of the access management network element.

In a possible design of the third aspect, the access management network element may further send a first request message to the first network slice selection network element, for example, the access management network element may send the first request message to the first network slice selection network element after reporting the slice availability information to the first network slice selection network element and before determining that the first network slice selection network element is faulty or the communication link between the access management network element and the first network slice selection network element is faulty, where the first request message is used to subscribe to the change notification of the slice availability information of the access management network element, and/or the access management network element may further receive a first notification message from the first network slice selection network element, where the first notification message includes the changed slice availability information of the access management network element.

In this embodiment of this application, the first request message is sent to the first network slice selection network element, and the access management network element may subscribe to the slice availability service from the first network slice selection network element, so that the first network slice selection network element can notify the access management network element in time after the slice availability information of the access management network element changes.

According to a fourth aspect, an embodiment of this application provides another disaster recovery processing method. The method may be performed by a second network slice selection network element. For example, the second network slice selection network element may be a second NSSF. The method includes: The second network slice selection network element receives a synchronization request message from a first network slice selection network element, where the synchronization request message includes an identifier of an access management network element and slice availability information of the access management network element, the slice availability information is for supporting the second network slice selection network element in providing a slice availability service for the access management network element, and the second network slice selection network element is a disaster recovery network slice selection network element of the first network slice selection network element; the second network slice selection network element receives a fault notification message from a network repository function network element, where the fault notification message indicates that the first network slice selection network element is faulty; and the second network slice selection network element records a task deletion flag, where the task deletion flag is for sending a task deletion message to the first network slice selection network element after a fault of the first network slice selection network element is recovered, the task deletion message includes the identifier of the access management network element or a task identifier of a first subscription task, the first subscription task is a subscription task that is for the slice availability information of the access management network element and that is created in the first network slice selection network element, and the task deletion message indicates the first network slice selection network element to delete the first subscription task.

In this embodiment of this application, the second network slice selection network element may receive the synchronized slice availability information of the access management network element from the first network slice selection network element, and after receiving the fault notification message sent by the network repository function network element, take over the slice availability service for the access management network element that is originally under the charge of the first network slice selection network element. The second network slice selection network element may further send the task deletion message to the first network slice selection network element, to indicate the first network slice selection network element to delete the first subscription task. In this way, on one hand, it can be ensured that the slice availability service remains normal, on the other hand, procedure processing confusion caused by sending subscription notifications by a plurality of network slice selection network elements to a same access management network element is avoided, and uniqueness of the slice availability information of the access management network element is ensured.

In a possible design of the fourth aspect, the second network slice selection network element may further receive a fault recovery message from the network repository function network element, where the fault recovery message indicates fault recovery of the first network slice selection network element. The second network slice selection network element sends the task deletion message to the first network slice selection network element based on the recorded task deletion flag.

In this embodiment of this application, it is considered that the first network slice selection network element may not be able to correctly delete a subscription task when the first network slice selection network element is faulty, therefore, the second network slice selection network element may not immediately send the task deletion message to the first network slice selection network element, but records the task deletion flag, and sends the task deletion message to the first network slice selection network element after determining that a function of the first network slice selection network element is restored. In this way, it can be ensured that the first network slice selection network element can correctly delete the first subscription task.

In a possible design of the fourth aspect, the second network slice selection network element may create a second subscription task for the slice availability information of the access management network element. For example, after determining that the first network slice selection network element is faulty, the second network slice selection network element may take over the subscription task that is for the slice availability information and that is in the first network slice selection network element, and create the second subscription task. The second subscription task is used to notify the access management network element when the slice availability information of the access management network element changes.

In this embodiment of this application, the second network slice selection network element may create the second subscription task based on the fault notification message received from the network repository function network element, to provide the slice availability service for the access management network element. To be specific, when the slice availability information of the access management network element changes, the second network slice selection network element sends a notification message to the access management network element, to notify the access management network element of changed slice availability information.

In a possible design of the fourth aspect, the second network slice selection network element may further send a second notification message to the access management network element, where the second notification message includes the changed slice availability information of the access management network element.

In a possible design of the fourth aspect, the second network slice selection network element may receive task information of the first subscription task from the first network slice selection network element, where the task information includes the task identifier of the first subscription task.

In this embodiment of this application, the second network slice selection network element may include, in the task deletion message, the task identifier that is of the first subscription task and that is obtained from the first network slice selection network element, to indicate a specific subscription task that needs to be deleted to the first network slice selection network element.

According to a fifth aspect, an embodiment of this application provides a communication apparatus. The apparatus has a function of implementing the first network slice selection function network element in any one of the first aspect or the possible designs of the first aspect, has a function of implementing the second network slice selection function network element in any one of the second aspect or the possible designs of the second aspect, has a function of implementing the access management network element in any one of the third aspect or the possible designs of the third aspect, or has a function of implementing the second network slice selection function network element in any one of the fourth aspect or the possible designs of the fourth aspect. The apparatus may be a network device, an apparatus included in the network device, for example, a chip, or an apparatus including the network device. The functions of the communication apparatus may be implemented by hardware, or may be implemented by hardware by executing corresponding software. The hardware or the software includes one or more modules corresponding to the functions.

In a possible design, a structure of the apparatus includes a processing module and a transceiver module. The processing module is configured to support the apparatus in performing a function corresponding to the first network slice selection function network element in any one of the first aspect or the designs of the first aspect, performing a function corresponding to the second network slice selection function network element in any one of the second aspect or the designs of the second aspect, performing a function corresponding to the access management network element in any one of the third aspect or the designs of the third aspect, or performing a function corresponding to the second network slice selection function network element in any one of the fourth aspect or the designs of the fourth aspect. The transceiver module is configured to support communication between the apparatus and another communication device. For example, when the apparatus is a first network slice selection function network element, the apparatus may send a synchronization request message to a second network slice selection function network element, where the synchronization request message includes slice availability information reported by an access management network element. The communication apparatus may further include a storage module. The storage module is coupled to the processing module, and stores program instructions and data that are necessary for the apparatus. In an example, the processing module may be a processor, a communication module may be a transceiver, and the storage module may be a memory. The memory may be integrated with the processor, or may be disposed separately from the processor. This is not limited in this application.

In another possible design, a structure of the apparatus includes a processor, and may further include a memory. The processor is coupled to the memory, and may be configured to execute computer program instructions stored in the memory, so that the apparatus performs the method in any one of the first aspect or the possible designs of the first aspect, performs the method in any one of the second aspect or the designs of the second aspect, performs the method in any one of the third aspect or the designs of the third aspect, or performs the method in any one of the fourth aspect or the designs of the fourth aspect. Optionally, the apparatus further includes a communication interface, and the processor is coupled to the communication interface. When the apparatus is a network device, the communication interface may be a transceiver or an input/output interface. When the apparatus is a chip included in the network device, the communication interface may be an input/output interface of the chip. Optionally, the transceiver may be a transceiver circuit, and the input/output interface may be an input/output circuit.

According to a sixth aspect, an embodiment of this application provides a chip system, including a processor. The processor is coupled to a memory, the memory is configured to store a program or instructions; and when the program or the instructions are executed by the processor, the chip system is enabled to implement the method in any one of the first aspect or the possible designs of the first aspect, implement the method in any one of the second aspect or the possible designs of the second aspect, implement the method in any one of the third aspect or the possible designs of the third aspect, or implement the method in any one of the fourth aspect or the possible designs of the fourth aspect.

Optionally, the chip system further includes an interface circuit, and the interface circuit is configured to exchange code instructions with the processor.

Optionally, there may be one or more processors in the chip system, and the processor may be implemented by hardware or software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed independent of the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a seventh aspect, an embodiment of this application provides a computer-readable storage medium. The computer-readable storage medium stores a computer program or instructions, and when the computer program or the instructions are executed, a computer is enabled to perform the method in any one of the first aspect or the possible designs of the first aspect, perform the method in any one of the second aspect or the possible designs of the second aspect, perform the method in any one of the third aspect or the possible designs of the third aspect, or perform the method in any one of the fourth aspect or the possible designs of the fourth aspect.

According to an eighth aspect, an embodiment of this application provides a computer program product. When a computer reads and executes the computer program product, the computer is enabled to perform the method in any one of the first aspect or the possible designs of the first aspect, perform the method in any one of the second aspect or the possible designs of the second aspect, perform the method in any one of the third aspect or the possible designs of the third aspect, or perform the method in any one of the fourth aspect or the possible designs of the fourth aspect.

According to a ninth aspect, an embodiment of this application provides a communication system. The communication system includes a first network slice selection function network element, a second network slice selection function network element, and an access management network element. Optionally, the communication system may further include a network repository function network element.

BRIEF DESCRIPTION OF THE DRAWINGS

FIG. 2A and FIG. 2B are a schematic flowchart of a disaster recovery processing method according to an embodiment of this application;

DETAILED DESCRIPTION OF ILLUSTRATIVE EMBODIMENTS

To make objectives, technical solutions, and advantages of embodiments of this application clearer, the following further describes embodiments of this application in detail with reference to the accompanying drawings.

The technical solutions of embodiments of this application may be used in various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX) communication system, and a fifth generation (5G) system or a new radio (NR) system, or is used in a future communication system or another similar communication system.

Figure 1:
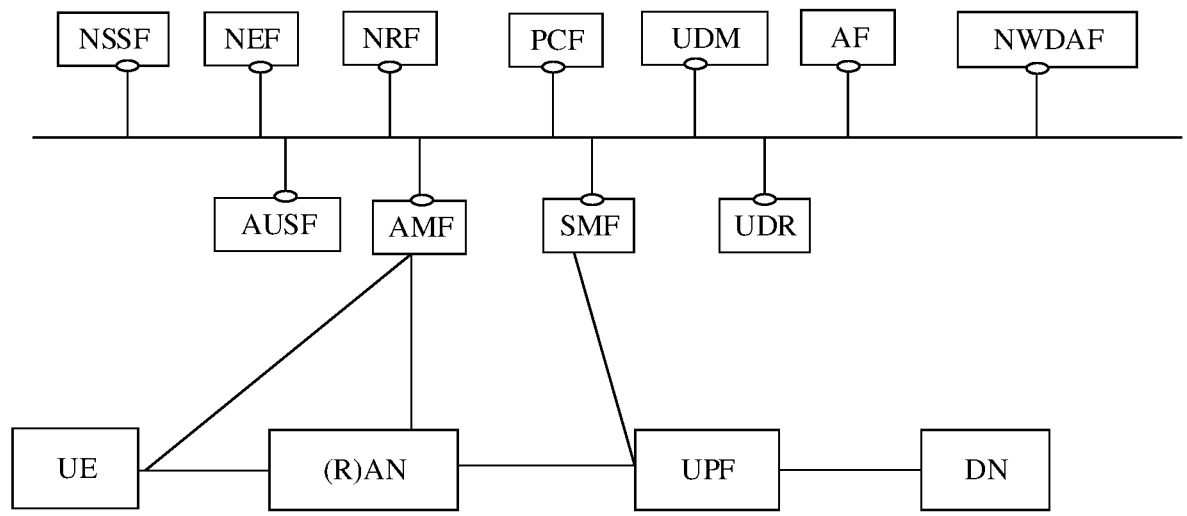
FIG. 1 is a schematic diagram of a network architecture of a communication system to which an embodiment of this application is applicable.

FIG. 1 is a schematic diagram of a network architecture of a communication system to which an embodiment of this application is applicable. The network architecture includes a terminal device, an access network device, an access management network element, a session management network element, a user plane network element, a policy control network element, a network slice selection network element, a network repository function network element, a network data analytics network element, a unified data management network element, a unified data repository network element, an authentication service function network element, a network capability exposure network element, an application function network element, and a data network (DN) connected to an operator network. The terminal device may send service data to the data network and receive the service data from the data network, by using the access network device and the user plane network element.

The terminal device is a device having a wireless transceiver function, and may be deployed on land, where the deployment includes indoor or outdoor, handheld, wearable, or vehicle-mounted deployment, may be deployed on water (for example, on a ship), or may be deployed in air (for example, on an airplane, a balloon, and a satellite). The terminal device may communicate with a core network through a radio access network (RAN), and exchange voice and/or data with the RAN. The terminal device may be a mobile phone, a tablet (Pad), a computer with a wireless transceiver function, a mobile internet device (MID), a wearable device, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application. The terminal device may also be sometimes referred to as user equipment (UE), a mobile station, a remote station, or the like. A specific technology, a device form, and a name that are used by the terminal device are not limited in embodiments of this application.

The access network device is a device that is in a network and that is configured to connect a terminal device to a wireless network. The access network device may be a node in the radio access network, and may also be referred to as a base station, or may also be referred to as a radio access network (RAN) node (or device). A network device may include an evolved NodeB (NodeB, eNB, or e-NodeB) in a long term evolution (LTE) system or an LTE-advanced (LTE-A) system, for example, a conventional macro base station eNB and a micro base station eNB in a heterogeneous network scenario, or may include a next generation NodeB (gNB) in a 5th generation (5G) mobile communication technology new radio (NR) system, or may further include a radio network controller (RNC), a NodeB (NB), a base station controller (BSC), a base transceiver station (BTS), a transmission reception point (TRP), a home base station (for example, a home evolved NodeB or a home NodeB, HNB), a baseband unit (BBU), a baseband pool BBU pool, a Wi-Fi access point (AP), or the like, or may further include a centralized unit (CU) and a distributed unit (DU) in a cloud access network (CloudRAN) system. This is not limited in embodiments of this application. In a split deployment scenario in which the access network device includes the CU and the DU, the CU supports protocols such as a radio resource control (RRC) protocol, a packet data convergence protocol (PDCP), and a service data adaptation protocol (SDAP), and the DU mainly supports a radio link control (RLC) layer protocol, a media access control (MAC) layer protocol, and a physical layer protocol.

The access management network element is mainly used for attachment, mobility management, and a tracking area update procedure of a terminal in a mobile network. The access management network element terminates a non-access stratum (NAS) message, completes registration management, connection management, reachability management, allocates a tracking area list (TA list), completes mobility management and the like, and transparently routes a session management (SM) message to the session management network element. In a 5th generation (5G) communication system, the access management network element may be an access and mobility management function (AMF). In a future communication system (for example, a 6G communication system), the mobility management network element may still be an AMF network element, or may have another name. This is not limited in this application.

The session management network element is mainly used for session management in a mobile network, for example, session establishment, modification, and release. A specific function is, for example, allocating an internet protocol (IP) address to the terminal, or selecting a user plane network element that provides a packet forwarding function. In the 5G communication system, the session management network element may be a session management function (SMF). In the future communication system (for example, the 6G communication system), the session management network element may still be an SMF network element, or may have another name. This is not limited in this application.

The user plane network element is mainly used for processing a user packet, for example, forwarding, charging, or lawful interception. The user plane network element may also be referred to as a protocol data unit (PDU) session anchor (PSA). In the 5G communication system, the user plane network element may be a user plane function (UPF). In the future communication system (for example, the 6G communication system), the user plane network element may still be a UPF network element, or may have another name. This is not limited in this application.

The policy control network element includes a user subscription data management function, a policy control function, a charging policy control function, quality of service (QoS) control, and the like. In the 5G communication system, the policy control network element may be a policy control function (PCF). In the future communication system (for example, the 6G communication system), the policy control network element may still be a PCF network element, or may have another name. This is not limited in this application.

A network slice selection function network element is mainly configured to select a proper network slice for a service of the terminal device. In the 5G communication system, the network slice selection network element may be a network slice selection function (NSSF) network element. In the future communication system (for example, the 6G communication system), the network slice selection network element may still be an NSSF network element, or may have another name. This is not limited in this application.

The network repository function network element is mainly configured to provide registration and discovery functions of a network element or a service provided by the network element. In the 5G communication system, the network repository function network element may be a network repository function (NRF). In the future communication system (for example, the 6G communication system), the network repository function network element may still be an NRF network element, or may have another name. This is not limited in this application.

The network data analytics network element may collect data from each network function (NF), for example, a policy control network element, a session management network element, a user plane network element, an access management network element, and an application function network element (by using a network capability exposure function network element), and perform analysis and prediction. In the 5G communication system, the network data analytics network element may be a network data analytics function (NWDAF). In the future communication system (for example, the 6G communication system), the network data analytics network element may still be an NWDAF network element, or may have another name. This is not limited in this application.

The unified data management network element is mainly configured to manage subscription information of the terminal device. In the 5G communication system, the unified data management network element may be unified data management (UDM). In the future communication system (for example, the 6G communication system), the unified data management network element may still be a UDM network element, or may have another name. This is not limited in this application.

The unified data repository network element is mainly configured to store structured data information, including subscription information, policy information, and network data or service data defined in a standard format. In the 5G communication system, the unified data repository network element may be a unified data repository (UDR). In the future communication system (for example, the 6G communication system), the unified data repository network element may still be a UDR network element, or may have another name. This is not limited in this application.

The authentication service function network element is mainly configured to perform security authentication on the terminal device. In the 5G communication system, the authentication service function network element may be an authentication server function (AUSF). In the future communication system (for example, the 6G communication system), the authentication service function network element may still be an AUSF network element, or may have another name. This is not limited in this application.

The network capability exposure network element may expose some functions of the network to an application in a controlled manner. In the 5G communication system, the network capability exposure network element may be a network capability exposure function (network exposure function, NEF). In the future communication system (for example, the 6G communication system), the network capability exposure network element may still be an NEF network element, or may have another name. This is not limited in this application.

The application function network element may provide service data of various applications for a control plane network element in a communication network of an operator, or obtain data information and control information of a network from a control plane network element in a communication network. In the 5G communication system, the application function network element may be an application function (AF). In the future communication system (for example, the 6G communication system), the application function network element may still be an AF network element, or may have another name. This is not limited in this application.

The data network is mainly configured to provide a data transmission service for the terminal device. The data network may be a private network, for example, a local area network, may be a public data network (PDN), for example, the Internet, or may be a dedicated network jointly deployed by operators, for example, a dedicated network deployed to configure an IP multimedia network subsystem (IMS) service.

It should be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be jointly implemented by a plurality of devices, or may be one function module in one device. This is not specifically limited in embodiments of this application.

For ease of description, an example in which the access management network element is an AMF network element and the network slice selection function network element is an NSSF network element is used for description subsequently in this application. Further, the AMF network element is briefly referred to as an AMF, and the NSSF network element is briefly referred to as an NSSF. To be specific, all AMFs described subsequently in this application may be replaced with access management network elements, and all NSSFFs may be replaced with network slice selection function network elements.

The following describes in detail a network slice in embodiments of this application.

The network slice (NS) is a logical network that is customized based on different service requirements and that has a specific network feature on a physical or virtual network infrastructure. A 5G physical network may be abstractly divided into a plurality of network slices. Each network slice forms an end-to-end logical network. The plurality of network slices are logically isolated from each other and do not affect each other. The network slice may be a complete end-to-end network that includes a terminal, an access network, a transport network, a core network, and an application server, can provide a complete telecommunications service, and has a network capability. Alternatively, the network slice may be any combination of a terminal, an access network, a transport network, a core network, and an application server. The network slice may have one or more of the following features: The access network may support the network slice, or may not support the network slice. The access network may be shared by a plurality of network slices. Features of different network slices and network functions that form the different network slices may be different.

Currently, three types of network slices are defined in the 3rd generation partnership project (3GPP) protocol: enhanced mobile broadband (eMBB), ultra-reliable low-latency communication (uRLLC), and massive machine type communication (mMTC). Each network slice type is specific to a specific service type. For example, an eMBB slice type is specific to a service with a high data rate and high mobility, a uRLLC slice may be used for processing in a high-reliability and low-latency communication scenario, and an mMTC slice may serve a large quantity of services (such as sensor and wearable device services) with a small data volume, a high latency, and infrequent access. As users and services have increasingly higher requirements on network service customization, differences between different network services further increase. In the context of in-depth research and large-scale commercial deployment of 5G communication networks, types of network slices will increase significantly in the foreseeable future.

It should be noted that the terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of the description such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

Embodiment 1

Figure 2A:
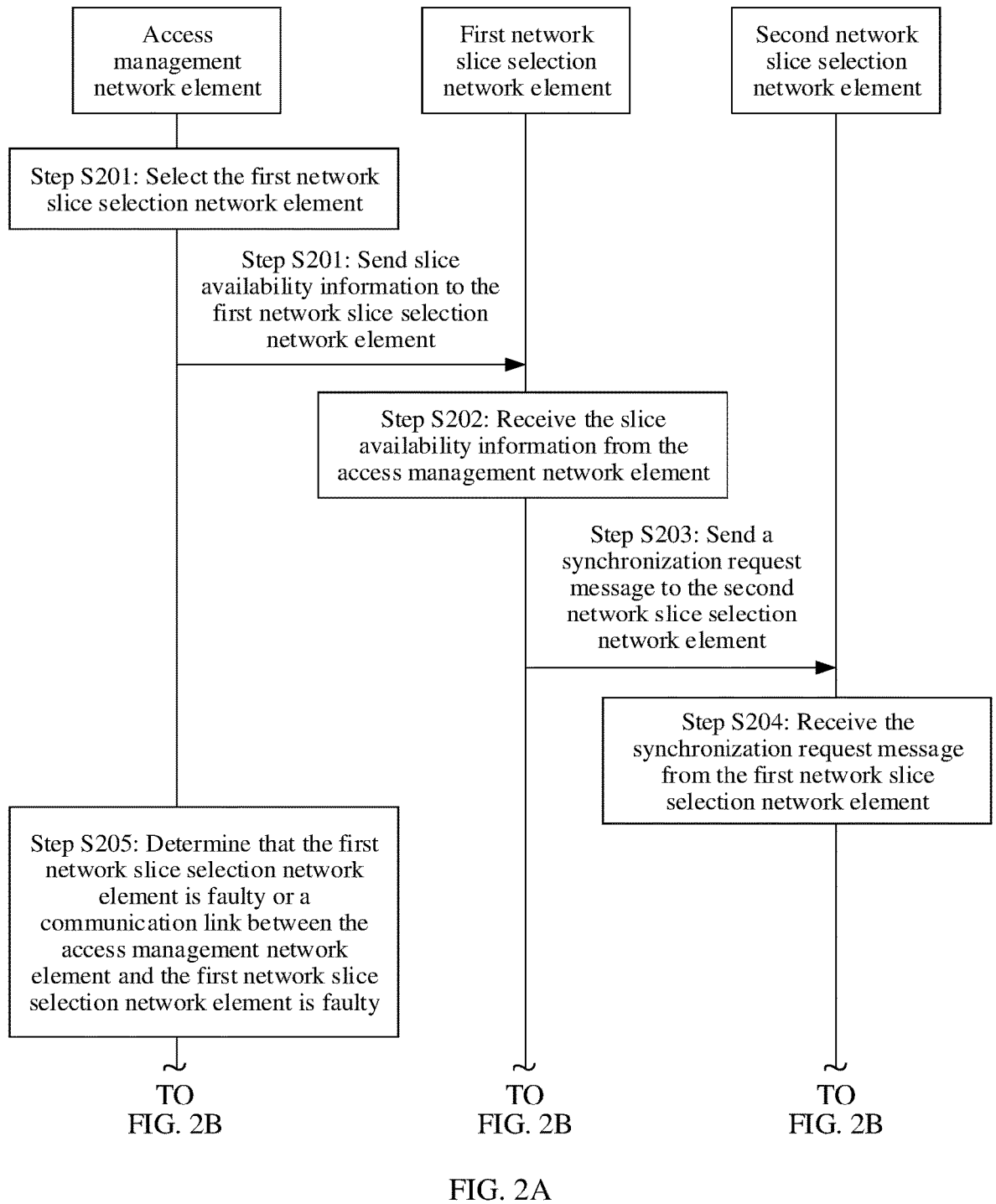

FIG. 2A and FIG. 2B are a schematic flowchart of a disaster recovery processing method according to an embodiment of this application. The method specifically includes the following steps.

Step S201: An access management network element selects a first network slice selection network element, and sends slice availability information to the first network slice selection network element.

In this embodiment of this application, the access management network element may be an access and mobility management function network element, namely, an AMF network element, and the first network slice selection network element and a second network slice selection network element may be network slice selection function network elements, namely, NSSF network elements.

The access management network element may select available network slice selection network elements by using a network repository function network element (for example, an NRF network element). The first network slice selection network element is one of the available network slice selection network elements provided by the network repository function network element for the access management network element.

The slice availability information includes information about a network slice supported by the access management network element in each area served by the access management network element, in other words, a specific network slice supported by the access management network element in each area supported by the access management network element. The area may include one or more cells, or may include one or more tracking areas (TAs). This is not limited in this application.

Step S202: The first network slice selection network element receives the slice availability information from the access management network element.

Step S203: The first network slice selection network element sends a synchronization request message to the second network slice selection network element.

The synchronization request message is used for sending the slice availability information that is received by the first network slice selection network element from the access management network element to the second network slice selection network element, or this may be understood as synchronizing or backing up the slice availability information that is received by the first network slice selection network element from the access management network element to the second network slice selection network element. The synchronization request message includes an identifier of the access management network element and the slice availability information that is received by the first network slice selection network element from the access management network element. The access management network element may be understood as an access management network element to which the slice availability information belongs. Optionally, the synchronization request message may further include information about a slice supported by each tracking area (namely, TA) related to the access management network element, in other words, a specific network slice supported by each tracking area (namely, TA) related to the access management network element.

The second network slice selection network element is a disaster recovery network slice selection network element of the first network slice selection network element. The second network slice selection network element can perform a corresponding disaster recovery processing procedure when a fault related to the first network slice selection network element occurs and recovers. For example, the second network slice selection network element may store the slice availability information sent by the first network slice selection network element by using the synchronization request message, and continue to provide a slice availability subscription service for a user based on the slice availability information, to ensure that the slice availability service provided by a network slice selection function remains normal and is not interrupted due to a fault of a single network slice selection network element.

In this embodiment of this application, a disaster recovery relationship between the first network slice selection network element and the second network slice selection network element may be unidirectional, or may be mutual (that is, the disaster recovery relationship is bidirectional). A unidirectional disaster recovery relationship means that the second network slice selection network element is a disaster recovery network slice selection network element of the first network slice selection network element, but the first network slice selection network element is not a disaster recovery network slice selection network element of the second network slice selection network element. A mutual disaster recovery relationship means that the second network slice selection network element is a disaster recovery network slice selection network element of the first network slice selection network element, and the first network slice selection network element is also a disaster recovery network slice selection network element of the second network slice selection network element.

Further, the first network slice selection network element may have one or more disaster recovery network slice selection network elements. The second network slice selection network element in this embodiment of this application is one of the one or more disaster recovery network slice selection network elements of the first network slice selection network element. When the first network slice selection network element has a plurality of disaster recovery network slice selection network elements, the first network slice selection network element may send the synchronization request message to all the plurality of disaster recovery network slice selection network elements of the first network slice selection network element, so that reliability of the slice availability service is further enhanced.

It should be noted that the first network slice selection network element may configure information about the disaster recovery network slice selection network element of the first network slice selection network element before or after receiving the slice availability information from the access management network element. This is not limited in this application. The configuration may also be understood as configuring a disaster recovery relationship between the first network slice selection network element and another network slice selection network element, or configuring a disaster recovery relationship between network slice selection network elements in a system. For example, the first network slice selection network element may configure a disaster recovery network slice selection network element of the first network slice selection network element according to a plan, and there may be one or more disaster recovery network slice selection network elements.

In a possible implementation, N+1 network slice selection network elements may form a set (set or pool), and all network slice selection network elements in the set may perform mutual disaster recovery, where N is a positive integer. In other words, when any network slice selection network element in the N+1 network slice selection network elements included in the set is faulty, all other N network slice selection network elements may be used as disaster recovery network slice selection network elements of the faulty network slice selection network element, to take over a service of the faulty network slice selection network element. In this scenario, if the first network slice selection network element is one network slice selection network element in the set, all remaining N network slice selection network elements other than the first network slice selection network element in the set may be used as disaster recovery network slice selection network elements of the first network slice selection network element, and the first network slice selection network element may send the synchronization request message to all the remaining N network slice selection network elements.

In another possible implementation, N+1 network slice selection network elements may form a set (set or pool), and all network slice selection network elements in the set may partially perform mutual disaster recovery, where N is a positive integer. In other words, when any network slice selection network element in the N+1 network slice selection network elements included in the set is faulty, other N network slice selection network elements or some network slice selection network elements in the other network slice selection network elements may be used as disaster network slice selection network elements of the faulty network slice selection network element, to take over a service of the faulty network slice selection network element. In this scenario, if the first network slice selection network element is one network slice selection network element in the set, the first network slice selection network element may send the synchronization request message to a disaster recovery network slice selection network element in the other N network slice selection network elements.

Figure 3A:
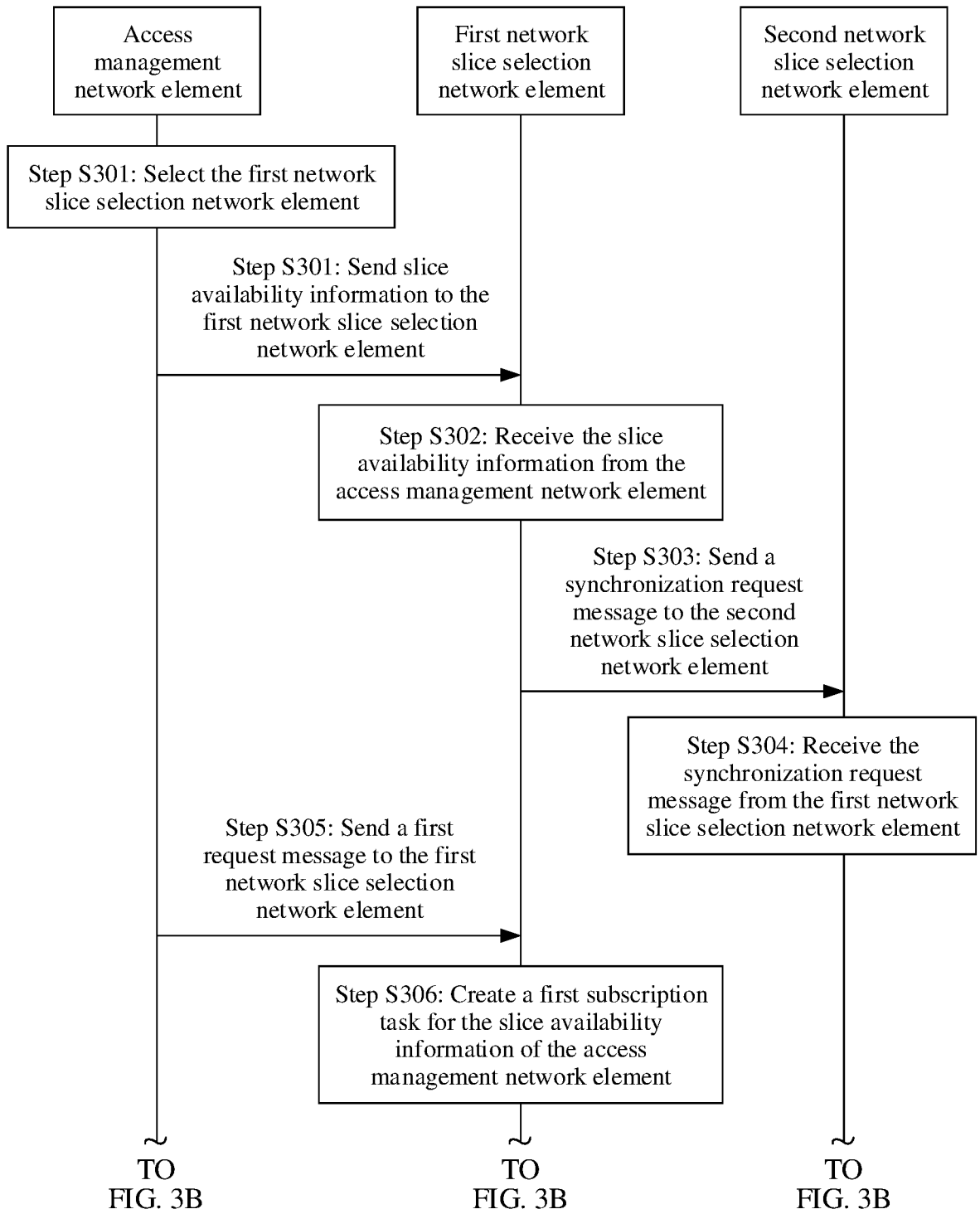
FIG. 3A and FIG. 3B are a schematic diagram in which an access management network element subscribes to a change notification of slice availability information from a first network slice selection network element according to an embodiment of this application.
Figure 3B:
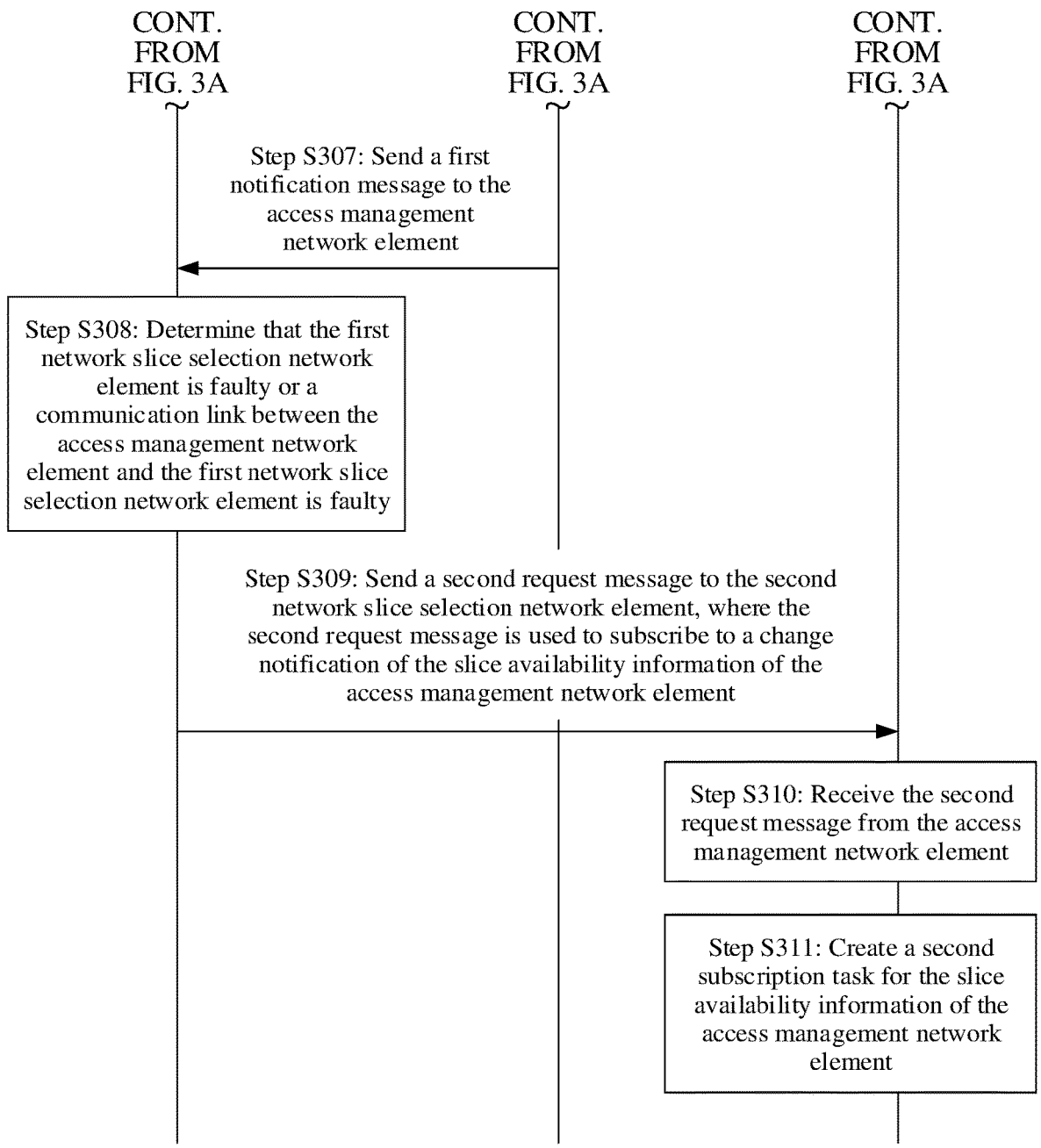

In this embodiment of this application, as shown in FIG. 3A and FIG. 3B, after the first network slice selection network element receives the slice availability information from the access management network element, in step S305, the first network slice selection network element may further receive a first request message from the access management network element, where the first request message is used to subscribe to a change notification of the slice availability information of the access management network element. The first request message includes the identifier of the access management network element, so that the first network slice selection network element sends the change notification of the slice availability information to the access management network element. Optionally, the first request message may further include one or more identifiers of one or more tracking areas (that is, TAs) supported by the access management network element, namely, a tracking area list (TAIlist) supported by the access management network element. Subsequently, in step S306, the first network slice selection network element may create a first subscription task for the slice availability information of the access management network element, where the first subscription task is used to notify the access management network element when the slice availability information of the access management network element changes. In this way, if the slice availability information of the access management network element changes, in step S307, the first network slice selection network element may send a first notification message to the access management network element, where the first notification message includes changed slice availability information of the access management network element. Other steps shown in FIG. 3A and FIG. 3B may be the same as specific implementations of corresponding steps in FIG. 2A and FIG. 2B. Details are not described herein again.

Optionally, after creating the first subscription task, the first network slice selection network element may further send task information related to the first subscription task to the access management network element and/or another network slice selection network element that has a disaster recovery relationship with the first network slice selection network element, where the second network slice selection network element is included. It should be noted that the first network slice selection network element may send only the task information related to the first subscription task to the access management network element, may send only the task information related to the first subscription task to the another network slice selection network element that has a disaster recovery relationship with the first network slice selection network element, or may send both the task information related to the first subscription task to the access management network element and the another network slice selection network element that has a disaster recovery relationship with the first network slice selection network element. This is not limited in this application.

The task information related to the first subscription task may include one or more items of information such as the identifier of the access management network element, the TAI list supported by the access management network element, a task identifier of the first subscription task, a subscription event type, and valid time of the first subscription task. For example, that the first network slice selection network element sends the information related to the first subscription task to the access management network element may be that the first network slice selection network element may send a first response message to the access management network element, where the first response message is used to respond to the first request message, and indicates that the corresponding first subscription task has been created. Therefore, the first network slice selection network element may include the task information of the first subscription task in the first response message.

It should be understood that an execution sequence of receiving, by the first network slice selection network element, the first request message from the access management network element and sending, by the first network slice selection network element, the synchronization request message to the second network slice selection network element is not limited in this embodiment of this application. In other words, the first network slice selection network element may receive the first request message from the access management network element after sending the synchronization request message to the second network slice selection network element, or may receive the first request message from the access management network element before sending the synchronization request message to the second network slice selection network element. Execution of step S303 and step S305 shown in FIG. 3A and FIG. 3B is not strictly limited in this application. If the first network slice selection network element receives the first request message from the access management network element before sending the synchronization request message to the second network slice selection network element, the first network slice selection network element may also include the task information of the first subscription task created by the first network slice selection network element in the synchronization request message sent to the second network slice selection network element, for example, the task identifier of the first subscription task.

Step S204: The second network slice selection network element receives the synchronization request message from the first network slice selection network element, where the synchronization request message includes the identifier of the access management network element and the slice availability information that is received by the first network slice selection network element from the access management network element.

Optionally, after receiving the synchronization request message, the second network slice selection network element may further send a synchronization response message to the first network slice selection network element, to indicate that the synchronization request message has been successfully received, or the slice availability information in the synchronization request message has been successfully stored or backed up.

Step S205: The access management network element determines that the first network slice selection network element is faulty, or a communication link between the access management network element and the first network slice selection network element is faulty.

Step S206: The access management network element sends a second request message to the second network slice selection network element, where the second request message includes an identifier of the first network slice selection network element, and the second request message is used to subscribe to the change notification of the slice availability information of the access management network element.

This embodiment of this application includes two fault scenarios related to the first network slice selection network element. One fault scenario is that the first network slice selection network element is faulty, and the other fault scenario is that the communication link between the access management network element and the first network slice selection network element is faulty.

Figure 4A:
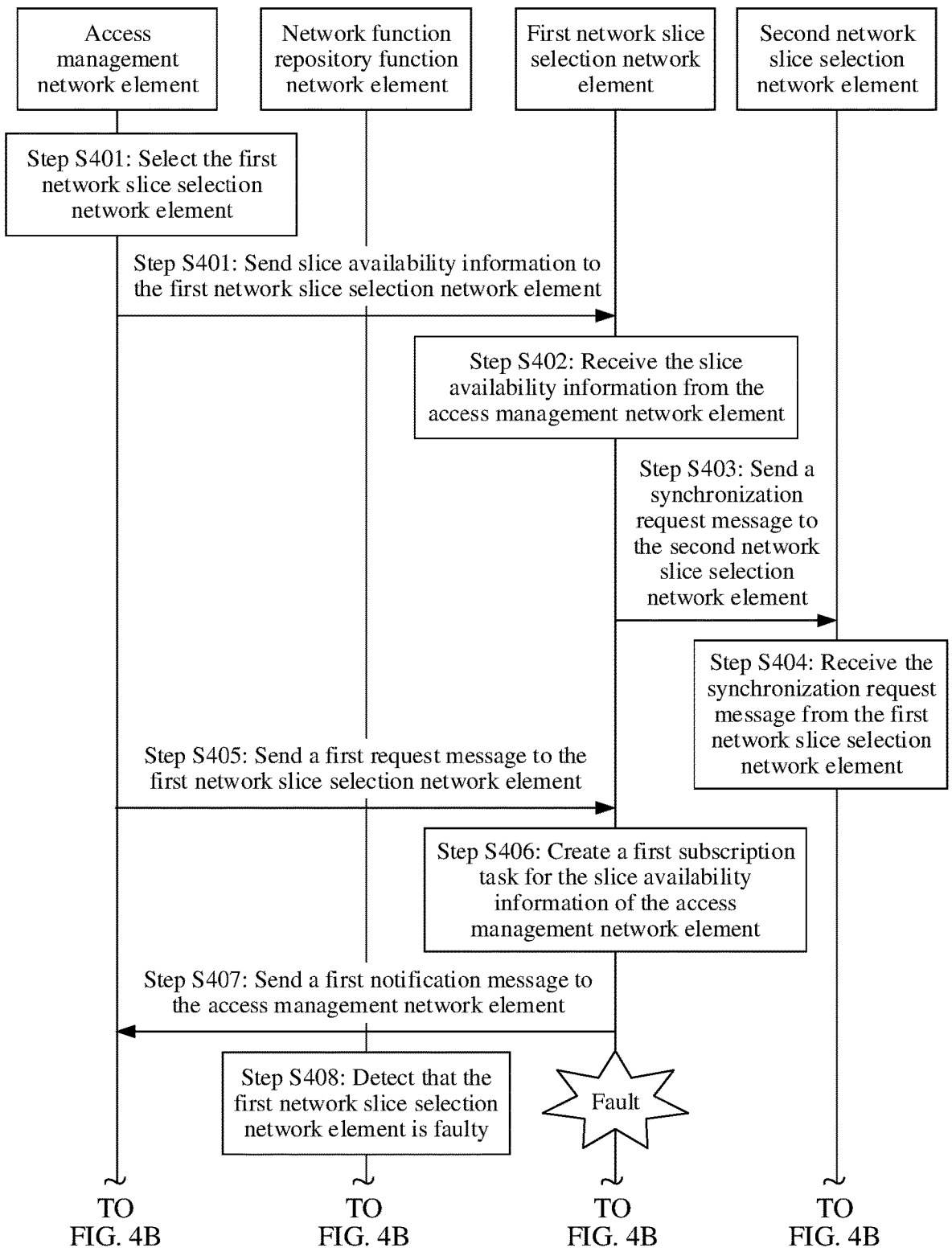
FIG. 4A and FIG. 4B are a schematic diagram of a scenario in which a first network slice selection network element is faulty according to an embodiment of this application.
Figure 4B:
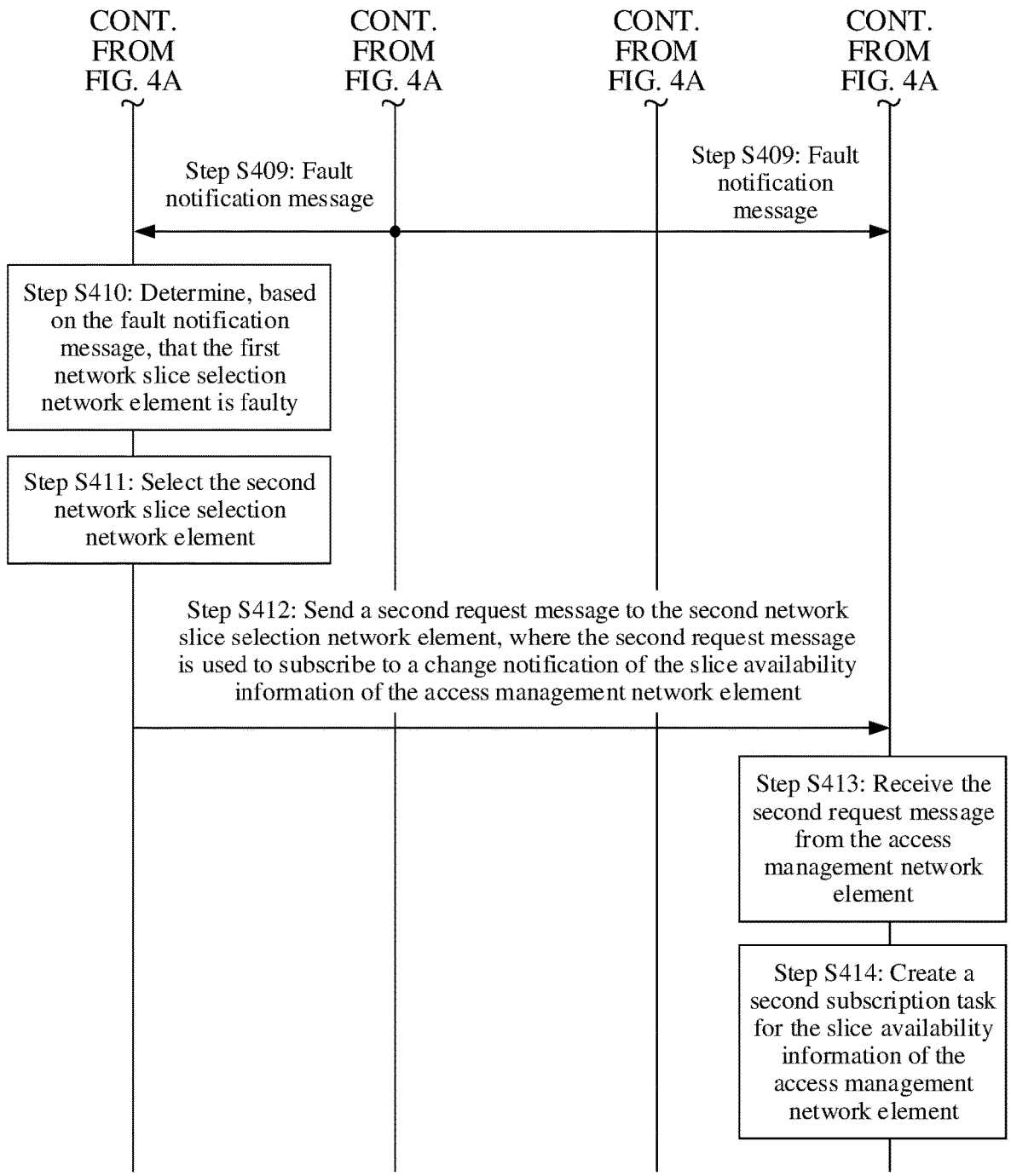

For a scenario in which the first network slice selection network element is faulty, as shown in FIG. 4A and FIG. 4B, the access management network element may determine, based on a fault notification message received from the network repository function network element (that is, an NRF network element), that the first network slice selection network element is faulty, then select, by using the network repository function network element, the second network slice selection network element that has the disaster recovery relationship and communicates normally with the first network slice selection network element, and send the second request message to the second network slice selection network element. The foregoing content is respectively corresponding to step S408 to step S412 in FIG. 4A and FIG. 4B. Specific implementations of other steps in FIG. 4A and FIG. 4B may be the same as specific implementations of corresponding steps in FIG. 2A and FIG. 2B or FIG. 3A and FIG. 3B. Details are not described herein again.

The network repository function network element may detect a status of the first network slice selection network element by using a heartbeat detection mechanism, and notify events such as a fault and fault recovery of the first network slice selection network element to an access management network element that subscribes to the status of the first network slice selection network element, a disaster recovery network slice selection network element of the first network slice selection network element, and another network element that may be further included, so that a network element related to the first network slice selection network element can sense the status of the first network slice selection network element. For example, the network repository function network element may detect the status of the first network slice selection network element by using the heartbeat detection mechanism. When detecting that the first network slice selection network element is faulty, the network repository function network element sends the fault notification message to the access management network element and the second network slice selection network element, to indicate that the first network slice selection network element is faulty. After detecting that a fault of the first network slice selection function network element is recovered, the network repository function network element may further send a fault recovery message to the access management network element and the second network slice selection network element, to indicate that the fault of the first network slice selection network element is recovered.

Figure 5A:
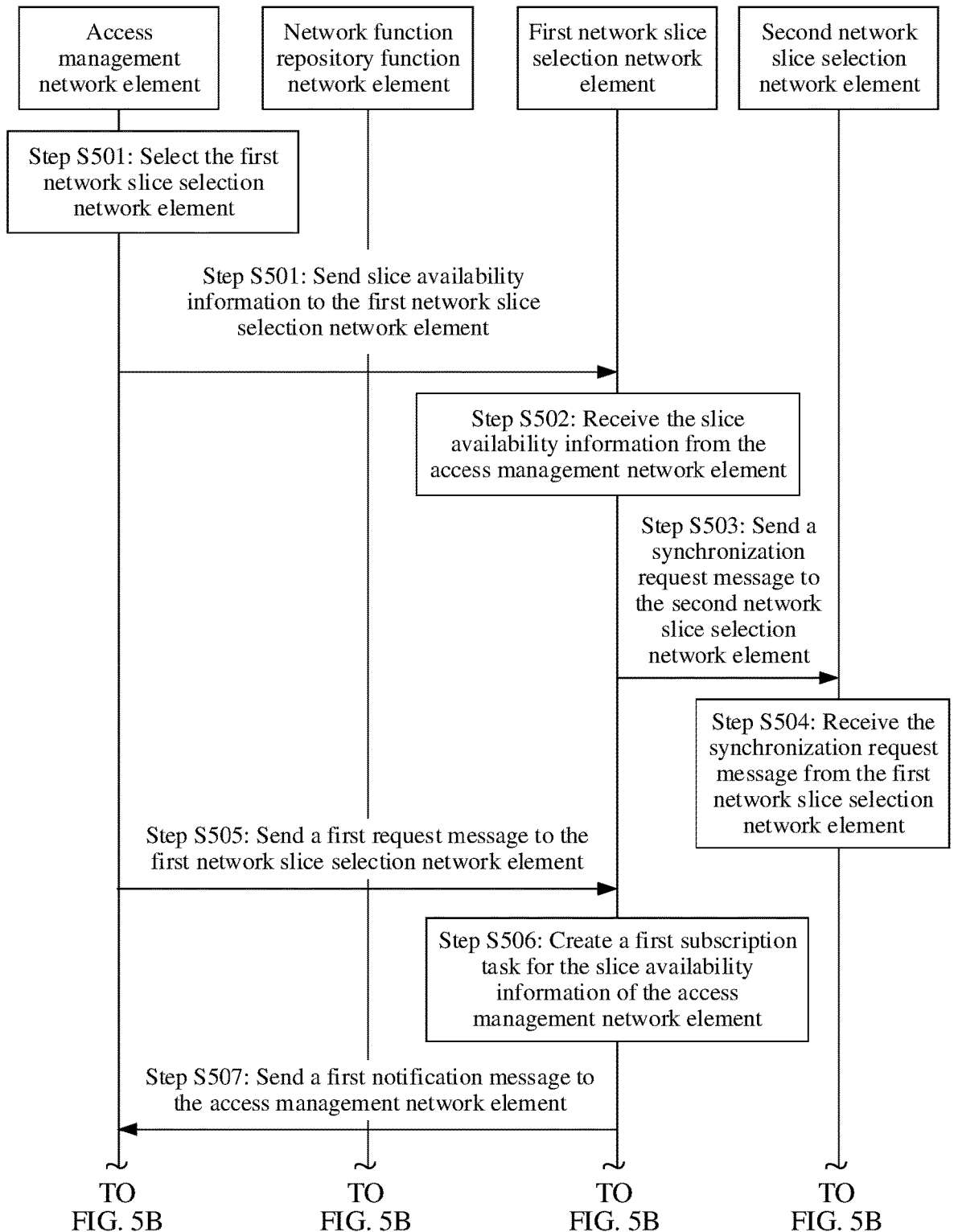
FIG. 5A and FIG. 5B are a schematic diagram of a scenario in which a communication link between an access management network element and a first network slice selection network element is faulty according to an embodiment of this application.
Figure 5B:
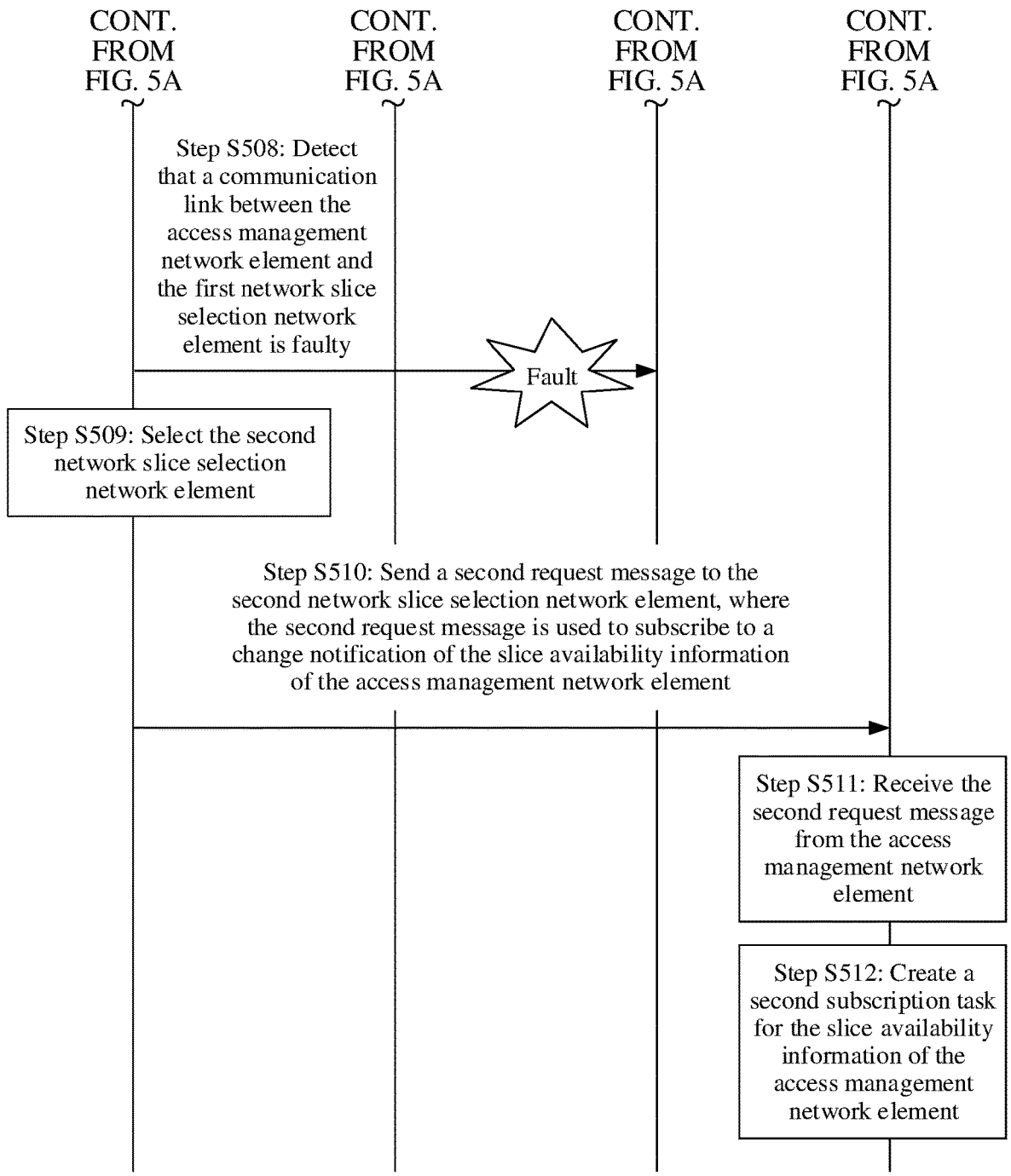

For a scenario in which the communication link between the access management network element and the first network slice selection network element is faulty, as shown in FIG. 5A and FIG. 5B, the access management network element may detect a status of the communication link between the access management network element and the first network slice selection network element, and when detecting that the communication link between the access management network element and the first network slice selection network element is faulty, select, via the network repository function network element, the second network slice selection network element that may have a disaster recovery relationship and communicate normally with the first network slice selection network element, and send the second request message to the second network slice selection network element. The foregoing content is respectively corresponding to step S508 to step S510 in FIG. 5A and FIG. 5B. Specific implementations of other steps in FIG. 5A and FIG. 5B may be the same as specific implementations of corresponding steps in FIG. 2A and FIG. 2B or FIG. 3A and FIG. 3B. Details are not described herein again.

The second request message is used by the access management network element to re-subscribe to the change notification of the slice availability information from the second network slice selection network element. The second request message includes the identifier of the access management network element and the identifier of the first network slice selection network element. The identifier of the access management network element is used by the second network slice selection network element to send the change notification of the slice availability information to the access management network element. The identifier of the first network slice selection network element indicates that the access management network element has previously subscribed to the change notification of the slice availability information from the first network slice selection network element. Optionally, the second request message may further include one or more identifiers of one or more tracking areas (that is, TAs) supported by the access management network element, namely, a tracking area list (TAIlist) supported by the access management network element. Optionally, the second request message may further include the task identifier of the first subscription task.

Step S207: The second network slice selection network element receives the second request message from the access management network element.

Step S208: The second network slice selection network element creates a second subscription task for the slice availability information of the access management network element, where the second subscription task is used to notify the access management network element when the slice availability information of the access management network element changes.

In this way, if the slice availability information of the access management network element changes, the second network slice selection network element may send a second notification message to the access management network element, where the second notification message includes changed slice availability information of the access management network element.

Step S209: The second network slice selection network element sends a task deletion message to the first network slice selection network element.

Step S210: The first network slice selection network element deletes the first subscription task.

To avoid processing procedure confusion caused by that the access management network element subscribes to the change notification of the slice availability information from a plurality of network slice selection network elements and the plurality of network slice selection network elements repeatedly send notifications of the slice availability information to a same access management network element, in this embodiment of this application, the second network slice selection network element may send the task deletion message to the first network slice selection network element after receiving the second request message or after successfully creating the second subscription task.

The task deletion message includes the identifier of the access management network element and/or the task identifier of the first subscription task, and indicates the first network slice selection network element to delete the first subscription task that is for the slice availability information of the access management network element and that is created by the first network slice selection network element, and no longer send the change notification of the slice availability information to the access management network element. In this way, after receiving the task deletion message, the first network slice selection network element may delete the previously created first subscription task based on the identifier of the access management network element or the task identifier of the first subscription task in the task deletion message. This effectively ensures that only one network slice selection network element sends the change notification of the slice availability information to the access management network element at a same moment, and the slice availability information of the access management network element is unique.

It should be noted that if the task deletion message includes the task identifier of the first subscription task, the task identifier of the first subscription task may be received by the second network slice selection network element from the first network slice selection network element. To be specific, after creating the first subscription task, the first network slice selection network element may send a task message of the first subscription task to the second network slice selection network element, and the second network slice selection network element obtains the task identifier of the first subscription task from the task information of the first subscription task. Alternatively, the task identifier of the first subscription task may be sent by the access management network element to the second network slice selection network element via the second request message. To be specific, after creating the first subscription task, the first network slice selection network element may send the task information of the first subscription task to the access management network element, where the task information includes the task identifier of the first subscription task. Then, the access management network element may include the task identifier of the first subscription task in the second request message when sending the second request message to the second network slice selection network element.

Figure 6A:
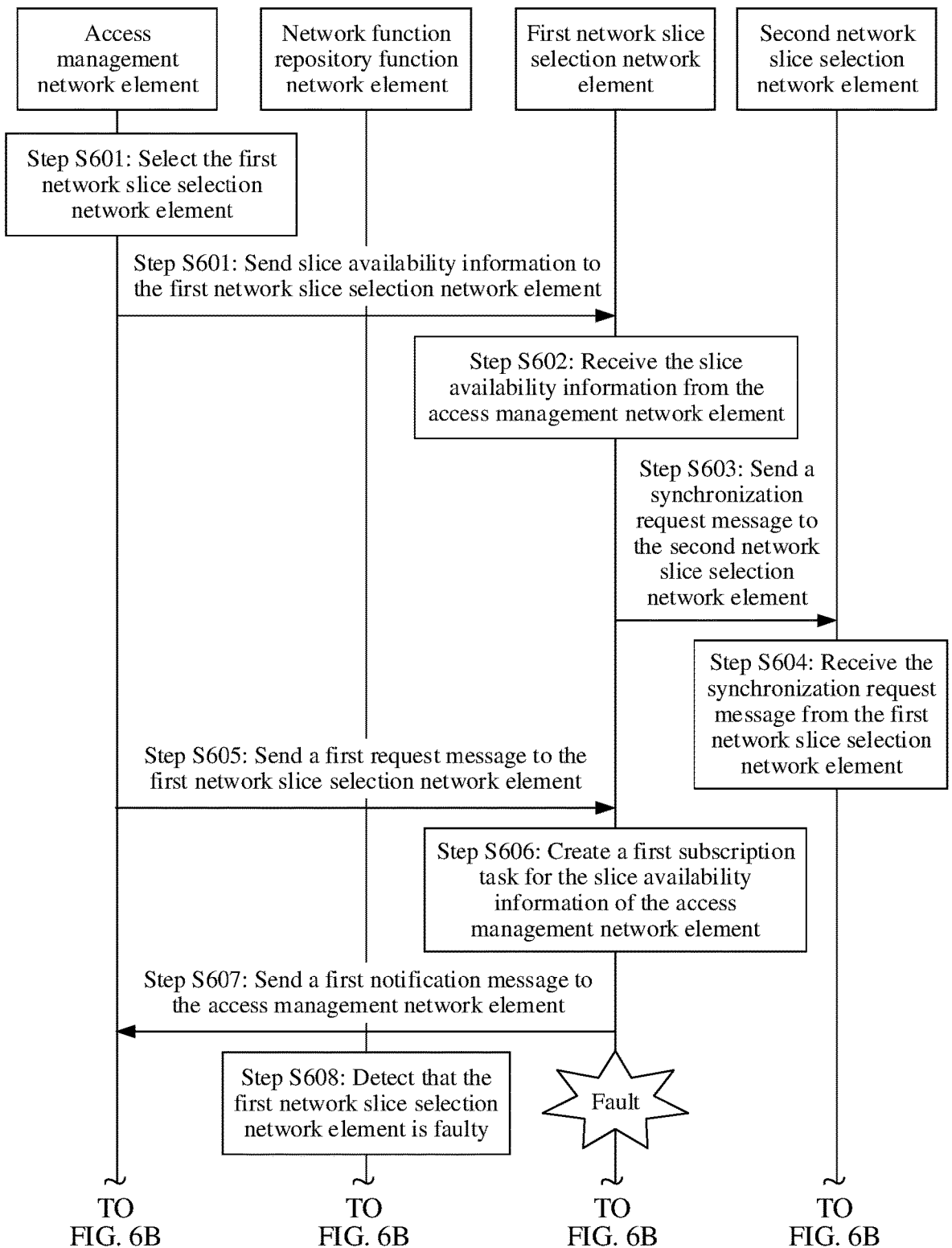
FIG. 6A and FIG. 6B are a schematic diagram in which a second network slice selection network element sends a task deletion message in a scenario in which a first network slice selection network element is faulty according to an embodiment of this application.
Figure 6B:
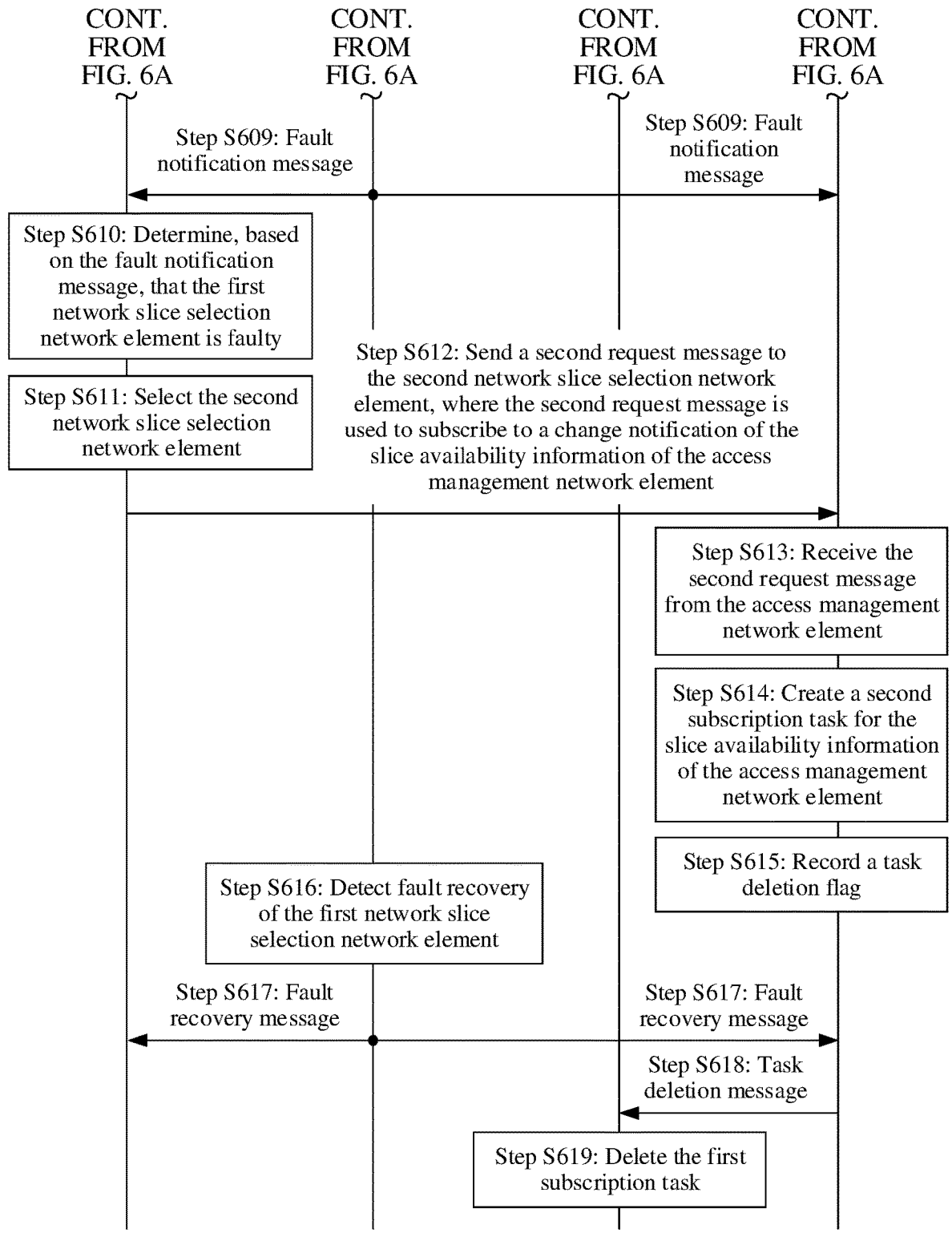

In a scenario in which the first network slice selection network element is faulty, the second network slice selection network element may not immediately send the task deletion message to the first network slice selection network element, but send the task deletion message to the first network slice selection network element after a fault of the first network slice selection network element is recovered. Specifically, as shown in FIG. 6A and FIG. 6B, in step S608 and step S609, when detecting that the first network slice selection network element is faulty, the network repository function network element may send the fault notification message to the access management network element and the second network slice selection network element, to notify the second network slice selection network element that the first network slice selection network element is faulty. Subsequently, if the second network slice selection network element receives the second request message from the access management network element, in step S614 and step S615, the second network slice selection network element may create the second subscription task for the slice availability information of the access management network element, and determine, based on the previously received fault notification message, to record a task deletion flag, so as to send the task deletion message to the first network slice selection network element after the fault of the first network slice selection network element is recovered. In step S616 and step S617, if the network repository function network element detects that the fault of the first network slice selection network element is recovered, the network repository function network element may send the fault recovery message to the access management network element and the second network slice selection network element, to notify the second network slice selection network element that the fault of the first network slice selection network element is recovered. In step S618, after determining that the fault of the first network slice selection network element is recovered, the second network slice selection network element may send the task deletion message to the first network slice selection network element based on the previously recorded task deletion flag. In step S619, the first network slice selection network element may delete the previously created first subscription task.

The task deletion flag may be a flag bit in a memory of the second network slice selection network element. For example, when the flag bit is 1 (or a non-zero value), it indicates that the task deletion message needs to be sent to the first network slice selection network element after the first network slice selection network element is restored. When the flag bit is 0 (or a zero value), it indicates that the task deletion message does not need to be sent to the first network slice selection network element. Certainly, the task deletion flag may alternatively have another implementation. This is not limited in this application.

Figure 7A:
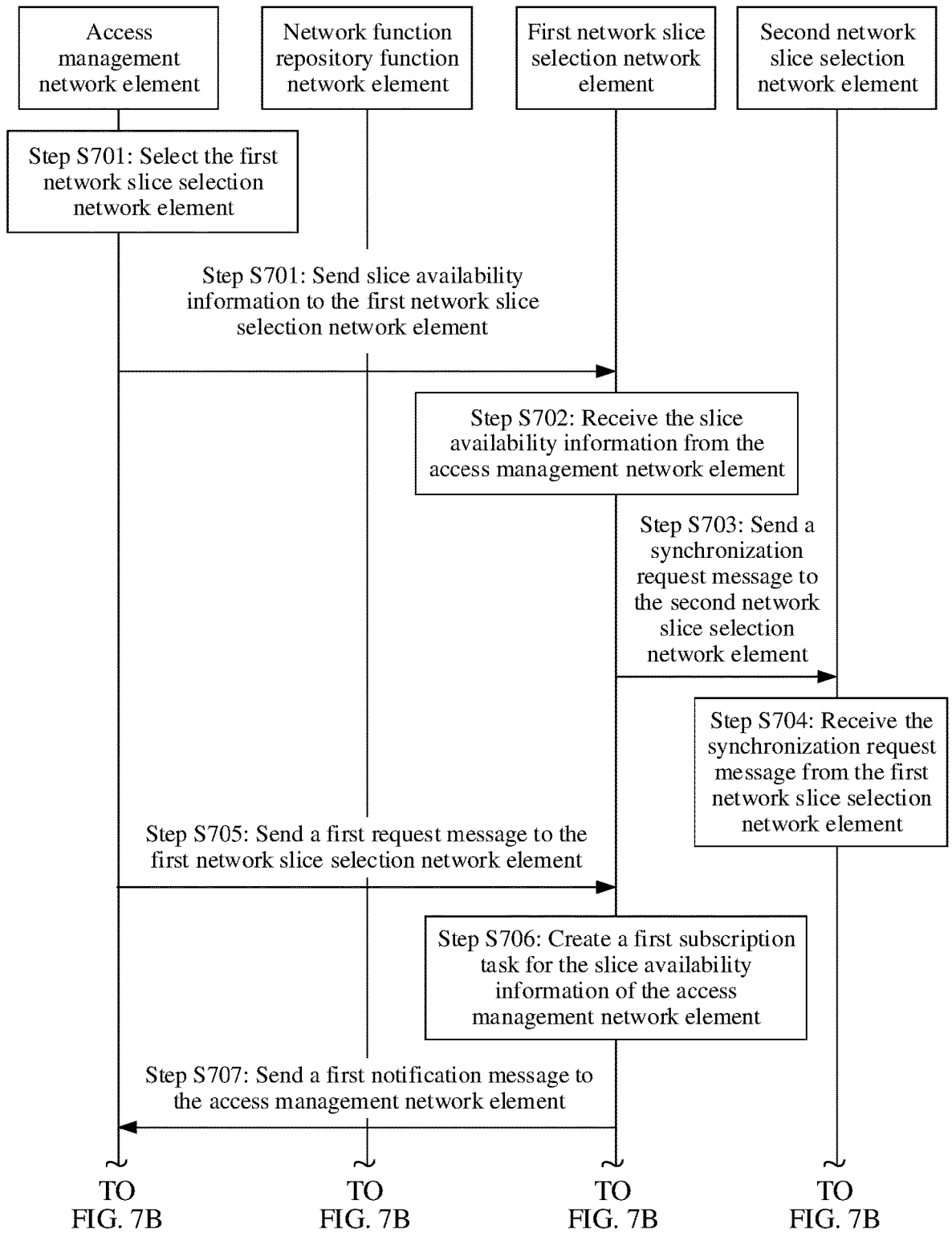
FIG. 7A and FIG. 7B are a schematic diagram in which a second network slice selection network element sends a task deletion message in a scenario in which a communication link between an access management network element and a first network slice selection network element is faulty according to an embodiment of this application.
Figure 7B:
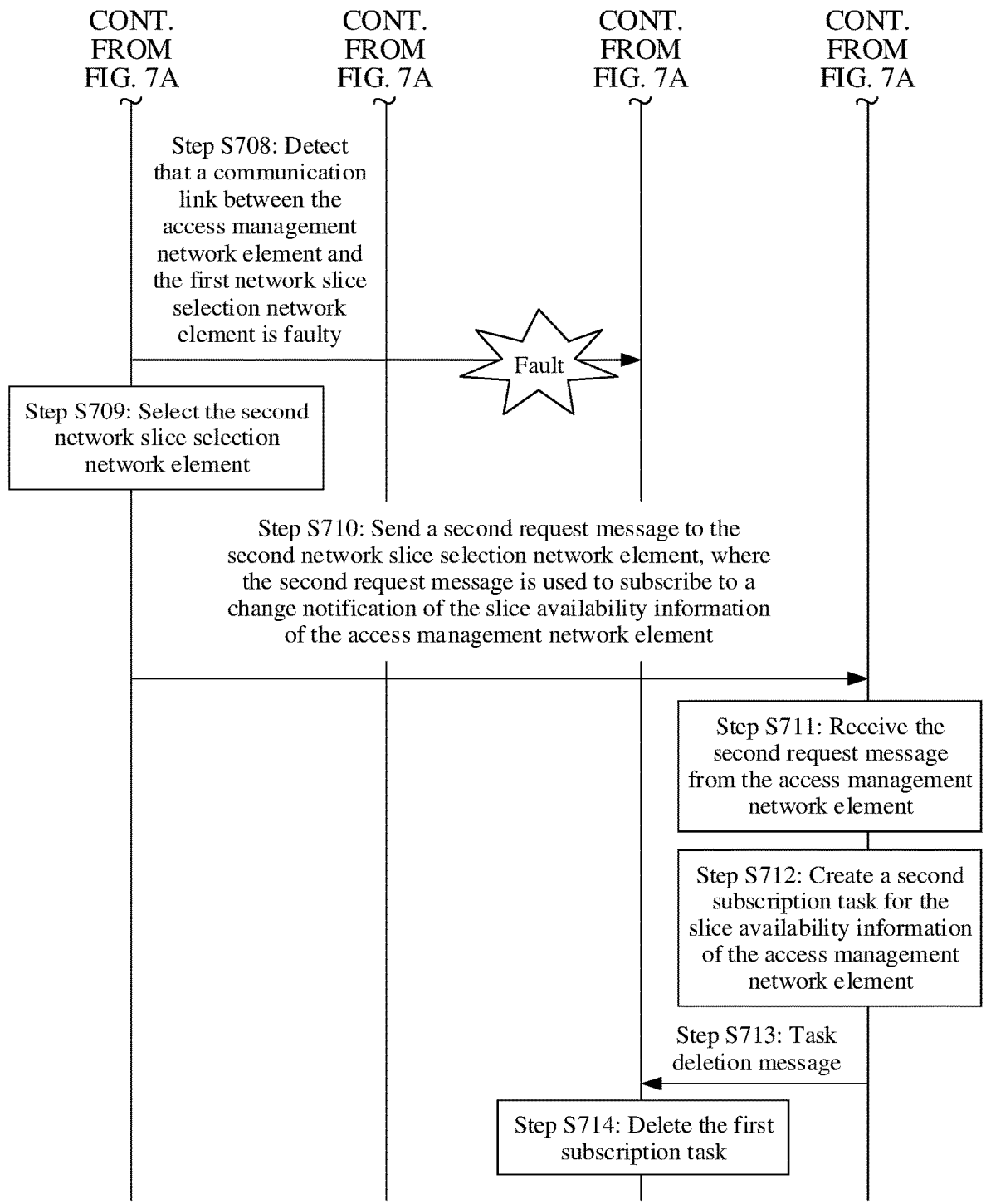

In a scenario in which the communication link between the access management network element and the first network slice selection network element is faulty, as shown in FIG. 7A and FIG. 7B, because the first network slice selection network element and communication between the first network slice selection network element and the second network slice selection network element are both normal, in step S713, after receiving the second request message or creating the second subscription task, the second network slice selection network element may directly send the task deletion message to the first network slice selection network element. In step 714, the first network slice selection network element may delete the previously created first subscription task.

Embodiment 2

A difference between Embodiment 2 and Embodiment 1 is that in Embodiment 1, after receiving the second request message that is sent by the access management network element and that is used to request the slice availability service, the second network slice selection network element may create the second subscription task, and determine to send the task deletion message to the first network slice selection network element. However, in Embodiment 2, if a second network slice selection network element receives a fault notification message sent by a network repository function network element and learns that a first network slice selection network element is faulty, the second network slice selection network element may automatically take over a slice availability service that is of an access management network element and that is originally under the charge of the first network slice selection network element, without a need for the access management network element to send a second request message for proactive request.

Figure 8A:
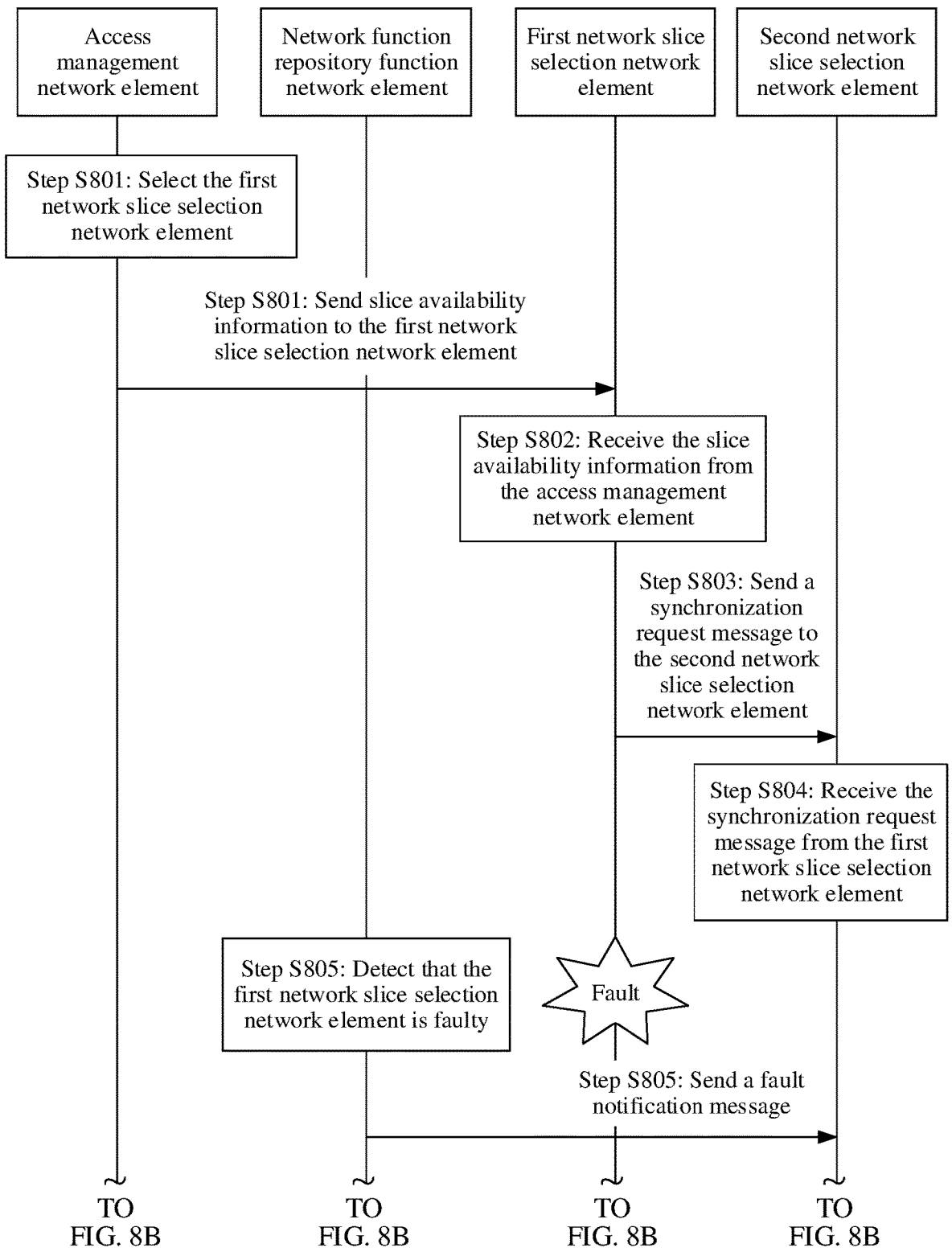
FIG. 8A and FIG. 8B are a schematic flowchart of another disaster recovery processing method according to an embodiment of this application.
Figure 8B:
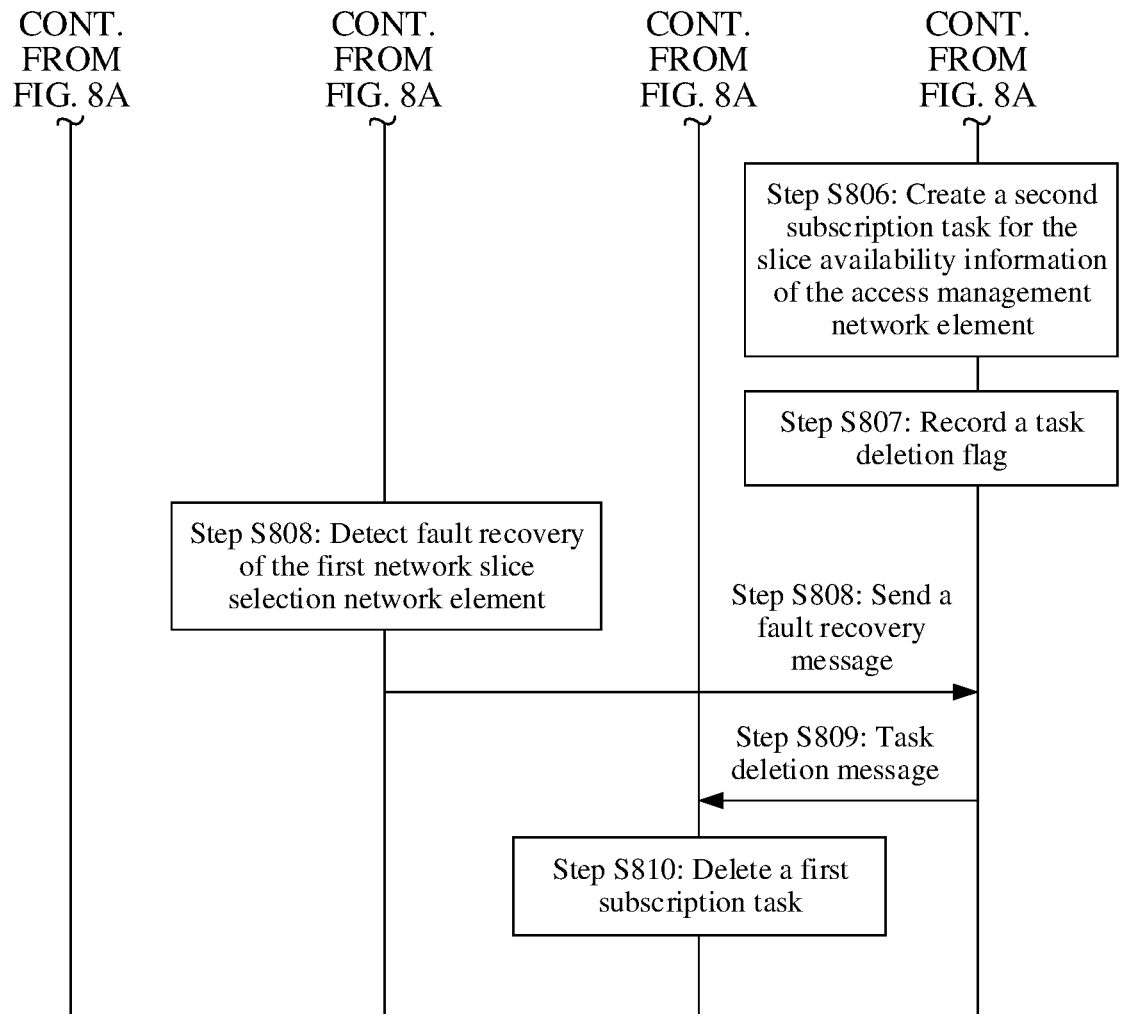

FIG. 8A and FIG. 8B are a schematic flowchart of another disaster recovery processing method according to an embodiment of this application. The method specifically includes the following steps.

Step S801: An access management network element selects a first network slice selection network element, and sends slice availability information to the first network slice selection network element.

Step S802: The first network slice selection network element receives the slice availability information from the access management network element.

Step S803: The first network slice selection network element sends a synchronization request message to a second network slice selection network element.

Step S804: The second network slice selection network element receives the synchronization request message from the first network slice selection network element, where the synchronization request message includes an identifier of the access management network element and the slice availability information that is received by the first network slice selection network element from the access management network element.

Step S805: The second network slice selection network element receives a fault notification message from a network repository function network element, where the fault notification message indicates that the first network slice selection network element is faulty.

In this embodiment of this application, after detecting that the first network slice selection network element is faulty, the network repository function network element may also send the fault notification message to the access management network element and/or another network element that subscribes to a status of the first network slice selection network element.

Step S806: The second network slice selection network element creates a second subscription task for the slice availability information of the access management network element, where the second subscription task is used to notify the access management network element when the slice availability information of the access management network element changes.

In this embodiment of this application, the second network slice selection network element may create the second subscription task after receiving the fault notification message. The second subscription task is a subscription task for the access management network element that originally subscribes to the slice availability service from the first network slice selection network element. In other words, the access management network element is an access management network element that originally subscribes to the slice availability service from the first network slice selection network element.

Then, if the slice availability information of the access management network element changes, for example, the second network slice selection network element adjusts an access policy of the access management network element, to modify the slice availability information of the access management network element, the second network slice selection network element may send a second notification message to the access management network element, where the second notification message includes changed slice availability information of the access management network element.

Step S807: The second network slice selection network element records a task deletion flag, where the task deletion flag is for sending a task deletion message to the first network slice selection network element after a fault of the first network slice selection network element is recovered.

Step S808: The second network slice selection network element receives a fault recovery message from the network repository function network element, where the fault recovery message indicates fault recovery of the first network slice selection network element.

Step S809: The second network slice selection network element sends the task deletion message to the first network slice selection network element, where the task deletion message includes the identifier of the access management network element and/or an identifier of a first subscription task.

Step S810: The first network slice selection network element deletes the first subscription task.

Specific implementations of step S801 to step S810 are the same as or similar to those in Embodiment 1. For details, refer to Embodiment 1. Details are not described herein again.

It should be understood that Embodiment 2 is applicable to a scenario in which the first network slice selection network element is faulty. The second network slice selection network element actively takes over, based on a fault status of the first network slice selection network element, the slice availability service that is originally under the charge of the first network slice selection network element.

Specifically, the second network slice selection network element may take over one or more subscription tasks for slice availability information of one or more access management network elements. In this way, the second network slice selection network element may create one or more subscription tasks respectively corresponding to the one or more access management network elements, and the second network slice selection network element may include one or more identifiers of the one or more access management network elements and/or one or more identifiers of the one or more subscription tasks in the first network slice selection network element in the task deletion message. Certainly, the second network slice selection network element may alternatively send a plurality of task deletion messages to the first network slice selection network element, and each task deletion message carries an identifier of one access management network element or an identifier of one subscription task in the first network slice selection network element. This is not limited in this application.

It should be further understood that if the first network slice selection network element has only one disaster recovery network slice selection network element, the disaster recovery network slice selection network element may take over all subscription tasks for slice availability information in the first network slice selection network element.

If the first network slice selection network element has a plurality of disaster recovery network slice selection network elements, in a possible implementation, the plurality of disaster recovery network slice selection network elements negotiate with each other to determine that one network slice selection network element serves as the second network slice selection network element to take over subscription tasks of slice availability information of all access management network elements in the first network slice selection network element. In another possible implementation, the plurality of disaster recovery network slice selection network elements may negotiate with each other, and determine a specific disaster recovery network slice selection network element to take over a subscription task for slice availability information of a specific access management network element in the first network slice selection network element. In other words, the plurality of disaster recovery network slice selection network elements may jointly take over subscription tasks of slice availability information of access management network elements in the first network slice selection network element, and each disaster recovery network slice selection network element may undertake subscription tasks of slice availability information of some access management network elements in the first network slice selection network element.

It should be noted that the foregoing two disaster recovery processing methods provided in embodiments of this application are described by using an access management network element (namely, an AMF network element) as an example. However, it should be understood that the disaster recovery processing method may also be applicable to another consumer network element (consumer NF) of a network slice selection network element. In other words, the another consumer network element (consumer NF) of the network slice selection network element may report slice availability information to a first network slice selection network element according to the method in the foregoing embodiment, send a first request message to the first network slice selection network element, to subscribe to a change notification of the slice availability information, and send a second request message to a second network slice selection network element when the first network slice selection network element is faulty or a communication link between the consumer network element and the first network slice selection network element is faulty, to re-subscribe to the change notification of the slice availability information. It should be further understood that when the disaster recovery processing method is applied to the another consumer network element of the network slice selection network element, the slice availability information may alternatively be replaced with other information that needs to be synchronously backed up between network slice selection network elements. This is not limited in this application.

Figure 9:
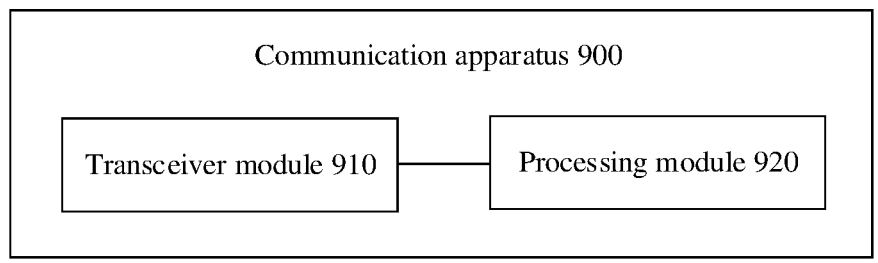
FIG. 9 is a schematic diagram of a structure of a communication apparatus according to an embodiment of this application.

An embodiment of this application further provides a communication apparatus. FIG. 9 is a schematic diagram of a structure of a communication apparatus according to an embodiment of this application. The communication apparatus 900 includes a transceiver module 910 and a processing module 920. The communication apparatus may be configured to implement functions of the first network slice selection network element in any one of the foregoing method embodiments, configured to implement functions of the second network slice selection network element in any one of the foregoing method embodiments, or configured to implement functions of the access management network element in any one of the foregoing method embodiments. For example, the communication apparatus may be a first NSSF network element, a second NSSF network element, or an AMF network element. The network element or network function may be a network element in a hardware device, a software function running on dedicated hardware, or a virtualized function instantiated on a platform (for example, a cloud platform).

The communication apparatus 900 may be used as a first network slice selection network element, and perform the steps performed by the first network slice selection network element in the foregoing method embodiments. The transceiver module 910 may be configured to support the communication apparatus 900 in performing communication, for example, performing sending and/or receiving actions performed by the first network slice selection network element in FIG. 2A and FIG. 2B to FIG. 8A and FIG. 8B. The processing module 920 may be configured to support the communication apparatus 900 in performing processing actions in the foregoing method embodiments, for example, performing the processing actions performed by the first network slice selection network element in FIG. 2A and FIG. 2B to FIG. 8A and FIG. 8B. Optionally, the communication apparatus 900 may further include a storage module 930 (not shown in FIG. 9), configured to store program code and data of the communication apparatus 900. For details, refer to the following descriptions.

The transceiver module 910 is configured to: receive slice availability information from an access management network element, where the slice availability information is for supporting the apparatus in providing a slice availability service for the access management network element, send a synchronization request message to a second network slice selection network element, where the synchronization request message includes an identifier of the access management network element and the slice availability information, and the second network slice selection network element is a disaster recovery network slice selection network element of the apparatus, and receive a task deletion message from the second network slice selection network element, where the task deletion message includes the identifier of the access management network element or a task identifier of a first subscription task, and the first subscription task is a subscription task that is for the slice availability information of the access management network element and that is created in the apparatus.

The processing module 920 is configured to delete the first subscription task.

In a possible design, the transceiver module 910 is further configured to receive a first request message from the access management network element, where the first request message is used to subscribe to a change notification of the slice availability information of the access management network element.

The processing module 920 is further configured to create the first subscription task, where the first subscription task is used to notify the access management network element when the slice availability information of the access management network element changes.

In a possible design, the transceiver module 910 is further configured to: send a first notification message to the access management network element, where the first notification message includes changed slice availability information of the access management network element, or send task information of the first subscription task to the access management network element and/or the second network slice selection network element, where the task information includes the task identifier of the first subscription task.

Alternatively, the communication apparatus 900 may be used as a second network slice selection network element, and perform the steps performed by the second network slice selection network element in the foregoing method embodiments. The transceiver module 910 may be configured to support the communication apparatus 900 in performing communication, for example, performing sending and/or receiving actions performed by the second network slice selection network element in FIG. 2A and FIG. 2B to FIG. 8A and FIG. 8B. The processing module 920 may be configured to support the communication apparatus 900 in performing processing actions in the foregoing method embodiments, for example, performing the processing actions performed by the second network slice selection network element in FIG. 2A and FIG. 2B to FIG. 8A and FIG. 8B. Optionally, the communication apparatus 900 may further include a storage module 930 (not shown in FIG. 9), configured to store program code and data of the communication apparatus 900. For details, refer to the following descriptions.

The transceiver module 910 is configured to: receive a synchronization request message from a first network slice selection network element, where the synchronization request message includes an identifier of an access management network element and slice availability information of the access management network element, the slice availability information is for supporting the apparatus in providing a slice availability service for the access management network element, and the apparatus is a disaster recovery network slice selection network element of the first network slice selection network element, and receive a second request message from the access management network element, where the second request message includes an identifier of the first network slice selection network element, and the second request message is used to subscribe to a change notification of the slice availability information of the access management network element.

The processing module 920 is configured to send a task deletion message to the first network slice selection network element, where the task deletion message includes the identifier of the access management network element or a task identifier of a first subscription task, the first subscription task is a subscription task that is for the slice availability information of the access management network element and that is created in the first network slice selection network element, and the task deletion message indicates the first network slice selection network element to delete the first subscription task.

In a possible design, the transceiver module 910 is further configured to receive a fault notification message from a network repository function network element, where the fault notification message indicates that the first network slice selection network element is faulty.

The processing module 920 is further configured to record a task deletion flag.

The transceiver module 910 is further configured to: receive a fault recovery message from the network repository function network element, where the fault recovery message indicates fault recovery of the first network slice selection network element, and send the task deletion message to the first network slice selection network element based on the recorded task deletion flag.

In a possible design, the processing module 920 is further configured to create a second subscription task for the slice availability information of the access management network element, where the second subscription task is used to notify the access management network element when the slice availability information of the access management network element changes.

In a possible design, the transceiver module 910 is further configured to send a second notification message to the access management network element, where the second notification message includes changed slice availability information of the access management network element.

In a possible design, the transceiver module 910 is further configured to receive task information of the first subscription task from the first network slice selection network element, where the task information includes the task identifier of the first subscription task, or the second request message includes the task identifier of the first subscription task.

The communication apparatus 900 may alternatively be used as an access management network element, and perform the steps performed by the access management network element in the foregoing method embodiments. The transceiver module 910 may be configured to support the communication apparatus 900 in performing communication, for example, performing sending and/or receiving actions performed by the access management network element in FIG. 2A and FIG. 2B to FIG. 8A and FIG. 8B. The processing module 920 may be configured to support the communication apparatus 900 in performing processing actions in the foregoing method embodiments, for example, performing the processing actions performed by the access management network element in FIG. 2A and FIG. 2B to FIG. 8A and FIG. 8B. Optionally, the communication apparatus 900 may further include a storage module 930 (not shown in FIG. 9), configured to store program code and data of the communication apparatus 1300. For details, refer to the following descriptions.

The transceiver module 910 is configured to: send slice availability information to a first network slice selection network element, where the slice availability information is for supporting the first network slice selection network element in providing a slice availability service for the apparatus;

The processing module 920 is configured to determine that the first network slice selection network element or a communication link between the apparatus and the first network slice selection network element is faulty.

The transceiver module 910 is further configured to send a second request message to a second network slice selection network element, where the second request message includes an identifier of the first network slice selection network element, the second request message is used to subscribe to a change notification of the slice availability information of the apparatus, and the second network slice selection network element is a disaster recovery network slice selection network element of the first network slice selection network element.

In a possible design, the transceiver module 910 is further configured to receive a fault notification message from a network repository function network element, where the fault notification message indicates that the first network slice selection network element is faulty; or the processing module 920 is further configured to detect that the communication link between the apparatus and the first network slice selection network element is faulty.

In a possible design, the second request message further includes a task identifier of a first subscription task, and the first subscription task is a subscription task that is for the slice availability information of the access management network element and that is created in the first network slice selection network element.

The transceiver module 910 is further configured to receive task information of the first subscription task from the first network slice selection network element, where the task information includes the task identifier of the first subscription task.

In a possible design, the transceiver module 910 is further configured to receive a second notification message from the second network slice selection network element, where the second notification message includes changed slice availability information of the access management network element.

In a possible design, the transceiver module 910 is further configured to: send a first request message to the first network slice selection network element, where the first request message is used to subscribe to the change notification of the slice availability information of the apparatus, and/or receive a first notification message from the first network slice selection network element, where the first notification message includes the changed slice availability information of the access management network element.

It should be noted that the processing module 920 in the communication apparatus 900 may be implemented by using a processor or a processor-related circuit component, and may be a processor or a processing unit. The transceiver module 910 may be implemented by using a transceiver or a transceiver-related circuit component, and may be a transceiver or a transceiver unit.

Figure 10:
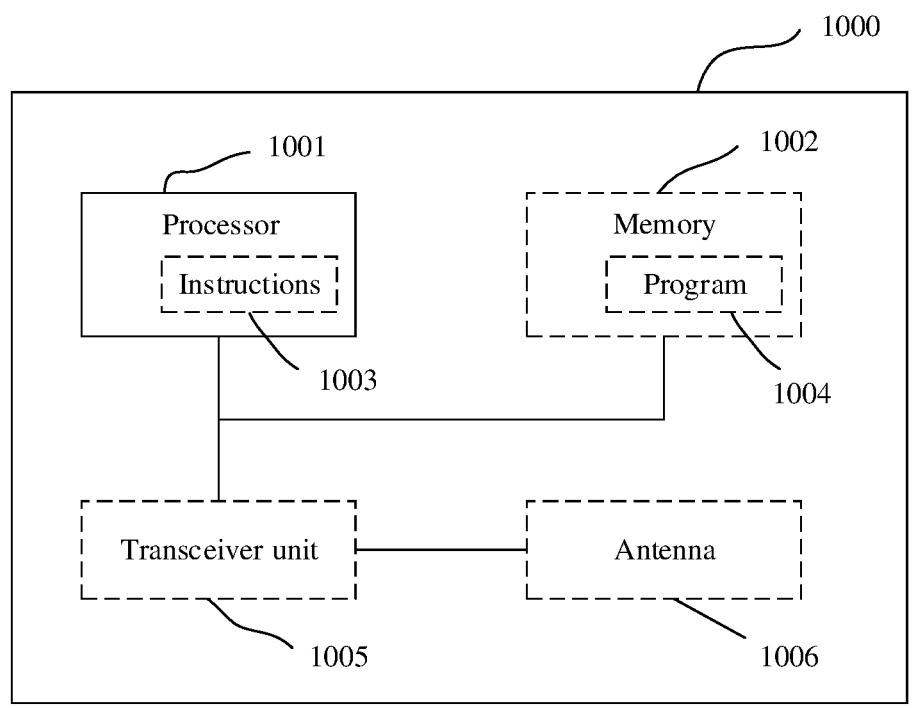
FIG. 10 is a schematic diagram of a structure of another communication apparatus according to an embodiment of this application.

FIG. 10 is a schematic diagram of another structure of a communication apparatus according to an embodiment of this application. The communication apparatus 1000 may be configured to implement the methods described in the foregoing method embodiments. The communication apparatus 1000 may be a chip or a network device.

The communication apparatus 1000 includes one or more processors 1001. The one or more processors 1001 may support the communication apparatus 1000 in implementing the methods performed by the first network slice selection network element, the second network slice selection network element, or the access management network element in FIG. 2A and FIG. 2B to FIG. 8A and FIG. 8B. The processor 1001 may be a general-purpose processor or a dedicated processor. For example, the processor 1001 may be a central processing unit (central processing unit, CPU) or a baseband processor. The baseband processor may be configured to process communication data. The CPU may be configured to control the communication apparatus (for example, the network device, a terminal device, or the chip) to execute a software program and process data of the software program. The communication apparatus 1000 may further include a transceiver unit 1005, configured to input (receive) and output (send) a signal.

For example, the communication apparatus 1000 may be the chip, and the transceiver unit 1005 may be an input and/or output circuit of the chip. Alternatively, the transceiver unit 1005 may be a communication interface of the chip. The chip may be used as a component of the terminal device, the network device, or another wireless communication device.

The communication apparatus 1000 may include one or more memories 1002. The memory 1002 stores a program 1004. The program 1004 may be run by the processor 1001 to generate instructions 1003, to enable the processor 1001 to perform, according to the instructions 1003, the methods described in the foregoing method embodiments. Optionally, the memory 1002 may further store data. Optionally, the processor 1001 may further read the data stored in the memory 1002. The data and the program 1004 may be stored at a same storage address, or the data and the program 1004 may be stored at different storage addresses.

The processor 1001 and the memory 1002 may be disposed separately, or may be integrated together, for example, integrated on a single board or a system on chip (system on chip, SOC).

The communication apparatus 1000 may further include the transceiver unit 1005 and an antenna 1006. The transceiver unit 1005 may be referred to as a transceiver machine, a transceiver circuit, or a transceiver, and is configured to implement a transceiver function of the communication apparatus by using the antenna 1006.

It should be understood that steps in the foregoing method embodiments may be implemented by using a logic circuit in a hardware form or instructions in a software form in the processor 1001. The processor 1001 may be a CPU, a digital signal processor (DSP), an application-specific integrated circuit (ASIC), a field programmable gate array (FPGA), or another programmable logic device, for example, a discrete gate, a transistor logic device, or a discrete hardware component.

An embodiment of this application further provides a chip system, including a processor, where the processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed independent of the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable controller (PLD), or another integrated chip.

It should be understood that steps in the foregoing method embodiments may be implemented by using a hardware integrated logic circuit or instructions in a software form in the processor. The steps of the method disclosed with reference to embodiments of this application may be directly performed by a hardware processor, or may be performed by using a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a first network slice selection network element, a second network slice selection network element, and an access management network element. Optionally, the communication system may further include a network repository function network element.

It should be understood that, the processor mentioned in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus applied to a first network slice selection network element, the apparatus comprising:
   at least one processor; and
   a non-transitory computer readable storage medium storing instructions that are executable by the at least one processor, the instructions including instructions for:
      receiving slice availability information from an access management network element, wherein the slice availability information supports the first network slice selection network element in providing a slice availability service to the access management network element;
      sending a synchronization request message to a second network slice selection network element, wherein the synchronization request message comprises an identifier of the access management network element and the slice availability information, and the second network slice selection network element is a disaster recovery network slice selection network element of the first network slice selection network element;
      receiving a task deletion message from the second network slice selection network element, wherein the task deletion message comprises the identifier of the access management network element or a task identifier of a first subscription task, and the first subscription task corresponds to the slice availability information of the access management network element and is created in the first network slice selection network element; and
      deleting the first subscription task; and
   wherein the first network slice selection network element providing the slice availability service to the access management network element comprises:
      receiving, by the first network slice selection network element, a first request message from the access management network element, wherein the first request message requests to subscribe to a change notification of the slice availability information of the access management network element; and
      creating, by the first network slice selection network element, the first subscription task, wherein the first subscription task is used to notify the access management network element when the slice availability information of the access management network element changes.

2. The apparatus according to claim 1, wherein the instructions further include instructions for:

sending a first notification message to the access management network element, wherein the first notification message comprises changed slice availability information of the access management network element.

3. The apparatus according to claim 1, wherein the instructions further include instructions for:
sending task information of the first subscription task to the access management network element, wherein the task information comprises the task identifier of the first subscription task.

4. The apparatus according to claim 1, wherein the instructions further include instructions for:
sending task information of the first subscription task to the second network slice selection network element, wherein the task information comprises the task identifier of the first subscription task.

5. An apparatus, comprising:
a transceiver, configured to:
receive a synchronization request message from a first network slice selection network element, wherein the synchronization request message comprises an identifier of an access management network element and slice availability information of the access management network element, the slice availability information supports the apparatus in providing a slice availability service for the access management network element, and the apparatus is a disaster recovery network slice selection network element of the first network slice selection network element; and
receive a second request message from the access management network element, wherein the second request message comprises an identifier of the first network slice selection network element, and the second request message requests to subscribe to a change notification of the slice availability information of the access management network element;
at least one processor; and
a non-transitory computer readable storage medium storing instructions that are executed by the at least one processor, the instructions including instructions to:
send a task deletion message to the first network slice selection network element using the transceiver, wherein the task deletion message comprises the identifier of the access management network element or a task identifier of a first subscription task, the first subscription task corresponds to the slice availability information of the access management network element and is created in the first network slice selection network element, and the task deletion message indicates to the first network slice selection network element to delete the first subscription task;
wherein the transceiver is further configured to receive a fault notification message from a network repository function network element, wherein the fault notification message indicates that the first network slice selection network element is faulty;
wherein the instructions further include instructions for recording a task deletion flag; and
wherein the transceiver is further configured to:
receive a fault recovery message from the network repository function network element, wherein the fault recovery message indicates fault recovery of the first network slice selection network element; and
send the task deletion message to the first network slice selection network element based on the recorded task deletion flag.

6. The apparatus according to claim 5, wherein the instructions further include instructions to:
create a second subscription task for the slice availability information of the access management network element, wherein the second subscription task is used to notify the access management network element when the slice availability information of the access management network element changes.

7. The apparatus according to claim 6, wherein the transceiver is further configured to send a second notification message to the access management network element, wherein the second notification message comprises changed slice availability information of the access management network element.

8. The apparatus according to claim 6, wherein the transceiver is further configured to receive task information of the first subscription task from the first network slice selection network element, wherein the task information comprises the task identifier of the first subscription task.

9. The apparatus according to claim 6, wherein the second request message comprises the task identifier of the first subscription task.

10. A system, comprising:
an access management network element;
a first network slice selection network element; and
a second network slice selection network element, wherein the second network slice selection network element is a disaster recovery network slice selection network element of the first network slice selection network element;
wherein the access management network element is configured to:
send slice availability information to the first network slice selection network element, wherein the slice availability information supports the first network slice selection network element in providing a slice availability service to the access management network element;
send a first request message to the first network slice selection network element, wherein the first request message is used to subscribe to a change notification of the slice availability information of the access management network element;
determine that the first network slice selection network element or a communication link between the access management network element and the first network slice selection network element is faulty; and
send a second request message to the second network slice selection network element, wherein the second request message comprises an identifier of the first network slice selection network element, and the second request message requests to subscribe to the change notification of the slice availability information of the access management network element.

11. The system according to claim 10, wherein the access management network element is configured to determine that the first network slice selection network element or the communication link between the access management network element and the first network slice selection network element is faulty by:
receiving a fault notification message from a network repository function network element, wherein the fault notification message indicates that the first network slice selection network element is faulty; or
detecting that the communication link between the access management network element and the first network slice selection network element is faulty.

12. The system according to claim 11, wherein the second request message further comprises a task identifier of a first subscription task, and the first subscription task corresponds to the slice availability information of the access management network element and is created in the first network slice selection network element; and wherein the access management network element is further configured to receive task information of the first subscription task from the first network slice selection network element, wherein the task information comprises the task identifier of the first subscription task.

13. The system according to claim 10, wherein the access management network element is further configured to receive a second notification message from the second network slice selection network element, wherein the second notification message comprises changed slice availability information of the access management network element.

14. The system according to claim 10, wherein the access management network element is further configured to:

receive a first notification message from the first network slice selection network element, wherein the first notification message comprises changed slice availability information of the access management network element.

15. The system according to claim 10, wherein the second network slice selection network element is configured to:

receive a fault notification message from a network repository function network element, wherein the fault notification message indicates that the first network slice selection network element is faulty; and record a task deletion flag, wherein the task deletion flag corresponds to sending a task deletion message to the first network slice selection network element after a fault of the first network slice selection network element is recovered, the task deletion message comprises the identifier of the access management network element or a task identifier of a first subscription task, the first subscription task corresponds to the slice availability information of the access management network element and is created in the first network slice selection network element, and the task deletion message indicates to the first network slice selection network element to delete the first subscription task.

16. The system according to claim 15, wherein the second network slice selection network element is further configured to:

receive a fault recovery message from the network repository function network element, wherein the fault recovery message indicates fault recovery of the first network slice selection network element; and send the task deletion message to the first network slice selection network element based on the recorded task deletion flag.

17. The system according to claim 16, wherein the second network slice selection network element is further configured to:

create a second subscription task for the slice availability information of the access management network element, wherein the second subscription task is used to notify the access management network element when the slice availability information of the access management network element changes.

* * * * *